(12) United States Patent
Rice et al.

(10) Patent No.: US 9,896,223 B2
(45) Date of Patent: Feb. 20, 2018

(54) PUMP SYSTEMS FOR CONTROLLING PRESSURE LOADS

(71) Applicant: Wabash National, L.P., Lafayette, IN (US)

(72) Inventors: Keith Rice, Shawnee, KS (US); Sean Quinn, Manhatten, KS (US); George R. Larkin, Overland Park, KS (US); Martin Pelkey, Overland Park, KS (US)

(73) Assignee: Wabash National, L.P., Lafayette, IN (US)

( * ) Notice: Subject to any disclaimer, the term of this patent is extended or adjusted under 35 U.S.C. 154(b) by 63 days.

(21) Appl. No.: 14/969,987

(22) Filed: Dec. 15, 2015

(65) Prior Publication Data

US 2016/0167806 A1    Jun. 16, 2016

Related U.S. Application Data

(60) Provisional application No. 62/092,026, filed on Dec. 15, 2014.

(51) Int. Cl.
  *B64F 1/28* (2006.01)
  *F04B 17/06* (2006.01)
  *F04B 49/08* (2006.01)
  *F04B 53/10* (2006.01)

(52) U.S. Cl.
  CPC .............. *B64F 1/28* (2013.01); *F04B 17/06* (2013.01); *F04B 49/08* (2013.01); *F04B 53/10* (2013.01)

(58) Field of Classification Search
  CPC ..... B64F 1/28; B67D 7/04; B67D 7/58; F04B 49/08; F04B 53/10; F04B 17/06
  See application file for complete search history.

(56) References Cited

U.S. PATENT DOCUMENTS

| | | | | | |
|---|---|---|---|---|---|
| 2,537,266 | A | * | 1/1951 | Granberg | B64F 1/28 137/238 |
| 2,655,933 | A | * | 10/1953 | Odell | B64F 1/28 137/392 |
| 2,731,171 | A | * | 1/1956 | Mankin | B64F 1/28 137/255 |
| 2,868,226 | A | * | 1/1959 | Griswold | B64D 37/20 137/102 |
| 3,147,884 | A | * | 9/1964 | Sacco | B60P 3/224 222/1 |
| 2011/0048572 | A1 | * | 3/2011 | Batson | B64F 1/28 141/1 |

* cited by examiner

*Primary Examiner* — Timothy L Maust
*Assistant Examiner* — Andrew StClair
(74) *Attorney, Agent, or Firm* — Quarles & Brady LLP

(57) ABSTRACT

A pump system for controlling a pressure load delivered to an aircraft interface included in the pump system is disclosed. The pump system includes a pump circuit, a pump, and a valve system. The pump is coupled with the conduits and is configured to provide a pressure load to the aircraft interface to move fuel from a fuel reservoir through the conduits toward the aircraft interface in a fueling mode and to move fuel from the aircraft interface through the conduits toward the fuel reservoir in a defueling mode. The valve system is coupled to the conduits and configured to control the pressure load delivered to the aircraft interface to block the pressure load from exceeding either of a high-pressure threshold and a delta-pressure threshold.

12 Claims, 11 Drawing Sheets

PUMP SYSTEMS FOR CONTROLLING PRESSURE LOADS

CROSS REFERENCE TO RELATED APPLICATIONS

This application claims priority to and the benefit of U.S. Provisional Patent Application No. 62/092,026, filed 15 Dec. 2014, the disclosure of which is now expressly incorporated herein by reference.

FIELD OF THE DISCLOSURE

The present disclosure relates generally to pump systems, and more specifically, to a pump systems configured to control a pressure load produced by the pump system.

BACKGROUND

Pump systems such as, for example, fuel carts are used to move fluid. Fuel carts are sometimes used to fuel and defuel aircraft. Fuel carts may need to perform within given operating conditions. For example, it may be desirable to transfer fuel to or remove fuel from the aircraft at about a constant rate. Similarly, it may be desirable to transfer a set amount of fuel to or remove a fixed amount of fuel from the aircraft in a predetermined amount of time.

Some fuel carts use a first pump when fueling the aircraft and a second pump when defueling the aircraft. Each pump is selected to have properties suited for fueling or defueling, respectively. Having more than one pump adds cost and weight to the fuel cart. Other fuel carts use a single pump to fuel and defuel aircraft. The single pump may be suited for either fueling or defueling, but may not be suited for the other. As an example, a single pump may meet the operating conditions for fueling aircraft, but it may exceed the operating conditions for defueling aircraft. To block the pump from exceeding the operating conditions, the fuel cart may include a power regulator, a gearbox, valves, or valve systems to control the output of the fuel cart.

Accordingly, there remains a need for further contributions in this area of technology, including contributions that increase reliability and control and reduce labor, complexity, cost, and weight of applications.

SUMMARY

The present disclosure may comprise one or more of the following features recited in the attached claims and combinations thereof, and/or one or more of the following features and combination thereof.

In one aspect of the disclosure, an illustrative pump system is disclosed. Other embodiments include apparatuses, systems, devices, hardware, methods, and combinations for controlling pressure loads. Further embodiments, forms, features, aspects, benefits, and advantages of the present application shall become apparent from the description and figures provided herewith.

Various illustrative embodiments of a pump system are provided. According to an aspect of the present disclosure, a fuel cart for fueling and defueling an aircraft includes a mobile fuel reservoir, a single pump, a pump circuit, and a valve system. The mobile fuel reservoir is configured to store and transport fuel. The single pump is configured to move between a fueling mode in which the pump is configured to move fuel from the fuel reservoir to an aircraft and a defueling mode in which the pump is configured to move fuel from the aircraft to the fuel reservoir. The pump circuit includes a first three-way valve, a second three-way valve, and an aircraft interface. The first three-way valve is coupled to a first port of the pump and coupled to the fuel reservoir by a fuel withdraw conduit. The second three-way valve is coupled to the first three-way valve by an intermediate conduit, coupled to a second port of the pump, and coupled to the fuel reservoir by a fuel return conduit. The aircraft interface is fluidly coupled to the intermediate conduit between the first three-way valve and the second three-way valve to conduct fuel from the fuel reservoir into the aircraft when the pump is in the fueling mode and to conduct fuel from the aircraft toward the fuel reservoir when the pump is in the defueling mode.

The valve system is fluidly coupled to the intermediate conduit by a bypass conduit and fluidly coupled to the fuel withdraw conduit by a relief conduit. The valve system is configured to allow fluid communication between the intermediate conduit and the fuel withdraw conduit in response to one of (i) a pressure load of fuel in the bypass conduit that exceeds a high-pressure threshold to block a pressure load of fuel in the aircraft interface from exceeding the high-pressure threshold when the pump is in the fueling mode and (ii) a difference between atmospheric pressure and a pressure load of fuel in the bypass conduit that exceeds a delta-pressure threshold to block the pressure load of fuel in the aircraft interface from exceeding the delta-pressure threshold when the pump is in the defueling mode.

In some embodiments, the valve system includes a main valve and a valve control circuit. The main valve is fluidly coupled to the intermediate conduit by the bypass conduit and fluidly coupled to the fuel withdraw conduit by the relief conduit. The valve control circuit is fluidly coupled to the intermediate conduit, coupled to the fuel withdraw conduit, and coupled to the main valve. The main valve is configured to move between a closed position in which fluid commination between the intermediate conduit and the fuel withdraw conduit is blocked through the main valve and an open position in which fluid commination between the intermediate conduit and the fuel withdraw conduit is allowed through the main valve. The valve control circuit is configured to cause the main valve to move to the open position in response to one of (i) a pressure load of fuel in the bypass conduit that exceeds the high-pressure threshold when the pump is in the fueling mode and (ii) a difference between atmospheric pressure and a pressure load of fuel in the bypass conduit that exceeds the delta-pressure threshold when the pump is in the defueling mode.

In some embodiments, the main valve includes a housing and a diaphragm coupled to the housing to form a diaphragm chamber therebetween. The diaphragm includes a first surface configured to be acted on by fuel in the bypass conduit and the relief conduit and a second surface configured to be acted on by fuel in the diaphragm chamber. The main valve is configured to move to the closed position in response to a pressure of the fuel acting on the second surface being greater than or about equal to a pressure of the fuel acting on the first surface and to move to the open position in response to the pressure of the fuel acting on the second surface being less than the pressure of the fuel acting on the first surface.

In some embodiments, the valve control circuit includes a high-pressure controller valve having a first side and a second side. The first side is fluidly coupled to the bypass conduit by a fueling check tube and to the diaphragm chamber of the main valve by a fuel actuator tube. The second side is fluidly coupled to the relief conduit by a fueling relief tube.

In some embodiments, the high-pressure controller valve is configured to move from (i) a closed position in which fluid communication between the fueling check tube and the fueling relief tube is blocked so that fuel in the fueling check tube is conducted into the diaphragm chamber by the fuel actuator tube to cause a pressure of fuel in the diaphragm chamber acting on the second surface of the diaphragm to be about equal to the pressure of fuel in the bypass conduit acting on the first surface to cause the main valve to be in the closed position to (ii) an open position in which fluid communication between the fueling check tube and the fueling relief tube is allowed in response to a pressure load of fuel in the fueling check tube exceeding the high-pressure threshold to cause the pressure of fuel in the diaphragm chamber acting on the second surface of the diaphragm to be less than the pressure of fuel in the bypass conduit acting on the first surface to cause the main valve to move to the open position.

In some embodiments, the valve control circuit further includes a delta-pressure controller valve having a first side and a second side. The first side is fluidly coupled to the bypass conduit by a defueling relief tube. The second side is fluidly coupled to the diaphragm chamber of the main valve by a defueling actuator tube and coupled to the relief conduit by a defueling check tube.

In some embodiments, the delta-pressure controller valve is configured to move from (i) a closed position in which fluid communication between the defueling check tube and the defueling relief tube is blocked so that fuel in the defueling check tube is conducted into the diaphragm chamber by the defueling actuator tube to cause the pressure of fuel in the diaphragm chamber acting on the second surface of the diaphragm to be about equal to the pressure of fuel in the relief conduit acting on the first surface to cause the main valve to be in the closed position to (ii) an open position in which fluid communication between the defueling check tube and the defueling relief tube is allowed in response to either a difference between a pressure load of fuel in the defueling relief tube and the pressure load of fuel in the defueling check tube exceeding the delta-pressure threshold or a difference between a pressure load of fuel in the aircraft interface and the pressure load of fuel in the defueling check tube exceeding the delta-pressure threshold to cause the pressure of fuel in the diaphragm chamber acting on the second surface of the diaphragm to be less than the pressure of fuel in the relief conduit acting on the first surface to cause the main valve to move to the open position.

In some embodiments, the high-pressure threshold is in a range between about 20 pounds per square inch and about 200 pounds per square inch. In some embodiments, the delta-pressure threshold is in a range between about 5 pounds per square inch and about 25 pounds per square inch.

According to another aspect of the disclosure, a pump system includes a single fueling pump, a pump circuit, and a valve system. The single fueling pump is configured to move between a fueling mode in which the pump is operable to move fuel in a first direction and a defueling mode in which the pump is operable to move fuel in a second direction opposite the first direction. The pump circuit is fluidly coupled to the pump. The pump circuit includes a fuel withdraw conduit, a fuel return conduit, a fuel nozzle, a first three-way valve, and a second three-way valve. The fuel withdraw conduit has an opening operable to draw fuel into the pump circuit. The fuel return conduit has an opening operable to direct fuel out of the pump circuit. The fuel nozzle has an opening operable to conduct fuel into and out of the pump circuit. The first three-way valve is coupled to a first port of the pump, coupled to the fuel withdraw conduit, and coupled to the second three-way valve by an intermediate conduit. The second three-way valve is coupled to the first three-way valve by the intermediate conduit, coupled to a second port of the pump, and coupled to the fuel return conduit. The fuel nozzle is fluidly coupled to the intermediate conduit between the first three-way valve and the second three-way valve.

The valve system includes a main valve and a valve control circuit. The main valve is fluidly coupled to the intermediate conduit by a bypass conduit and fluidly coupled to the fuel withdraw conduit by a relief conduit. The valve control circuit is fluidly coupled to the intermediate conduit, coupled to the fuel withdraw conduit, and coupled to the main valve. The main valve is configured to move between a closed position in which fluid commination between the intermediate conduit and the fuel withdraw conduit is blocked and an open position in which fluid commination between the intermediate conduit and the fuel withdraw conduit is allowed, and the valve control circuit is configured to cause the main valve to move to the open position in response to one of (i) a pressure load of fuel in the bypass conduit exceeding a high-pressure threshold when the pump is in the fueling mode and (ii) a difference between a pressure of fuel in the relief conduit and a pressure load of fuel in at the fuel nozzle exceeding a delta-pressure threshold when the pump is in the defueling mode.

In some embodiments, the main valve includes a housing and a diaphragm coupled to the housing to form a diaphragm chamber therebetween. The diaphragm includes a first surface configured to be acted on by fuel in the bypass conduit and the relief conduit and a second surface configured to be acted on by fuel in the diaphragm chamber, and the main valve is configured to move to the closed position in response to a pressure of the fuel acting on the second surface being greater than or about equal to a pressure of the fuel acting on the first surface and to move to the open position in response to the pressure of the fuel acting on the second surface being less than the pressure of the fuel acting on the first surface.

In some embodiments, the valve control circuit includes a high-pressure controller valve having a first side and a second side. The first side is fluidly coupled to the bypass conduit by a fueling check tube and to the diaphragm chamber of the main valve by a fuel actuator tube. The second side is fluidly coupled to the relief conduit by a fueling relief tube.

In some embodiments, the high-pressure controller valve is configured to move from (i) a closed position in which fluid communication between the fueling check tube and the fueling relief tube is blocked so that fuel in the fueling check tube is conducted into the diaphragm chamber by the fuel actuator tube to cause the pressure of fuel in the diaphragm chamber acting on the second surface of the diaphragm to be about equal to the pressure of fuel in the bypass conduit acting on the first surface to cause the main valve to be in the closed position to (ii) an open position in which fluid communication between the fueling check tube and the fueling relief tube is allowed in response to a pressure load of fuel in the fueling check tube exceeding the high-pressure threshold to cause the pressure of fuel in the diaphragm chamber acting on the second surface of the diaphragm to be less than the pressure of fuel in the bypass conduit acting on the first surface to cause the main valve to move to the open position.

In some embodiments, the valve control circuit further includes a delta-pressure controller valve having a first side and a second side. The first side is fluidly coupled to the bypass conduit by a defueling relief tube. The second side is fluidly coupled to the diaphragm chamber of the main valve by a defueling actuator tube and coupled to the relief conduit by a defueling check tube.

In some embodiments, the delta-pressure controller valve is configured to move from (i) a closed position in which fluid communication between the defueling check tube and the defueling relief tube is blocked so that fuel in the defueling check tube is conducted into the diaphragm chamber by the defueling actuator tube to cause the pressure of fuel in the diaphragm chamber acting on the second surface of the diaphragm to be about equal to the pressure of fuel in the relief conduit acting on the first surface to cause the main valve to be in the closed position to (ii) an open position in which fluid communication between the defueling check tube and the defueling relief tube is allowed in response to either a difference between a pressure load of fuel in the defueling relief tube and the pressure load of fuel in the defueling check tube exceeding the delta-pressure threshold or a difference between a pressure load of fuel at the fuel nozzle and the pressure load of fuel in the defueling check tube exceeding the delta-pressure threshold to cause the pressure of fuel in the diaphragm chamber acting on the second surface of the diaphragm to be less than the pressure of fuel in the relief conduit acting on the first surface to cause the main valve to move to the open position.

In some embodiments, the high-pressure threshold is in a range between about 20 pounds per square inch and about 200 pounds per square inch. The delta-pressure threshold is in a range between about 5 pounds per square inch and about 25 pounds per square inch.

According to another aspect of the disclosure, a fuel cart includes a fuel reservoir configured to store fuel, a single pump, a pump circuit, and a valve system. The pump is configured to move between a fueling mode in which the pump is configured to move fuel from the fuel reservoir toward a fuel tank and a defueling mode in which the pump is configured to move fuel from the fuel tank toward the fuel reservoir. The pump circuit includes a first three-way valve, a second three-way valve, and a fuel nozzle. The first three-way valve is coupled to a first port of the pump and coupled to the fuel reservoir by a fuel withdraw conduit. The second three-way valve is coupled to the first three-way valve by an intermediate conduit, coupled to a second port of the pump, and coupled to the fuel reservoir by a fuel return conduit. The fuel nozzle is fluidly coupled to the intermediate conduit between the first three-way valve and the second three-way valve to conduct fuel from the fuel reservoir toward the fuel tank when the pump is in the fueling mode and to conduct fuel from the fuel tank toward the fuel reservoir when the pump is in the defueling mode. The valve system is configured to provide means for allowing fluid communication between the intermediate conduit and the fuel withdraw conduit in response to one of (i) a pressure load of fuel in the intermediate conduit exceeding a high-pressure threshold to block a pressure load of fuel at the fuel nozzle from exceeding the high-pressure threshold when the pump is in the fueling mode and (ii) a difference between a pressure load of fuel at the fuel nozzle and a pressure load of fuel in the fuel withdraw conduit exceeding a delta-pressure threshold to block the pressure load of fuel at the fuel nozzle from exceeding the delta-pressure threshold when the pump is in the defueling mode.

These and other features of the present disclosure will become more apparent from the following description of the illustrative embodiments.

Figure 1:
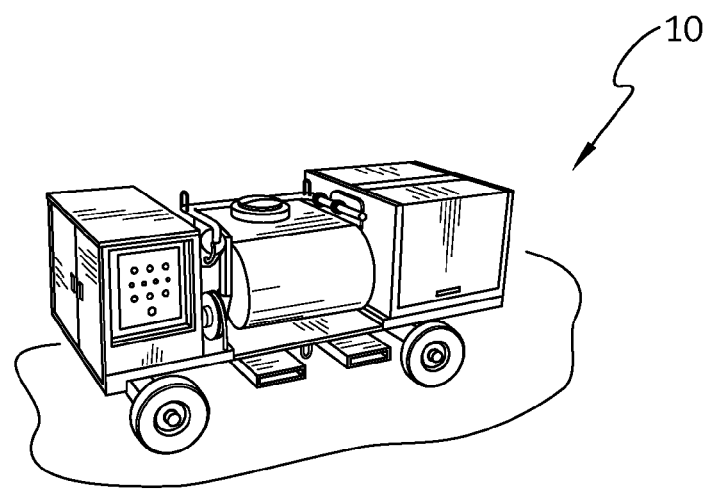
FIG. 1 is a perspective view of a pump system employing features of the present disclosure.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

For the purposes of promoting an understanding of the principles of the invention, reference will now be made to a number of illustrative embodiments shown in the attached drawings and specific language will be used to describe the same. While the concepts of this disclosure are described in relation to pump systems for use in fueling and defueling a fuel tank included in an aircraft, it will be understood that they are equally applicable to other fluid systems generally, and more specifically to filling and evacuating fluid tanks and pressure vessels used with aircraft, automobiles, energy plants, watercraft, commercial facilities, industrial facilities, and residential facilities. Further, the concepts of this disclosure are similarly applicable for use with any pump system in applications where it is desirable to control a pressure load produced by the pump system.

Figure 2:
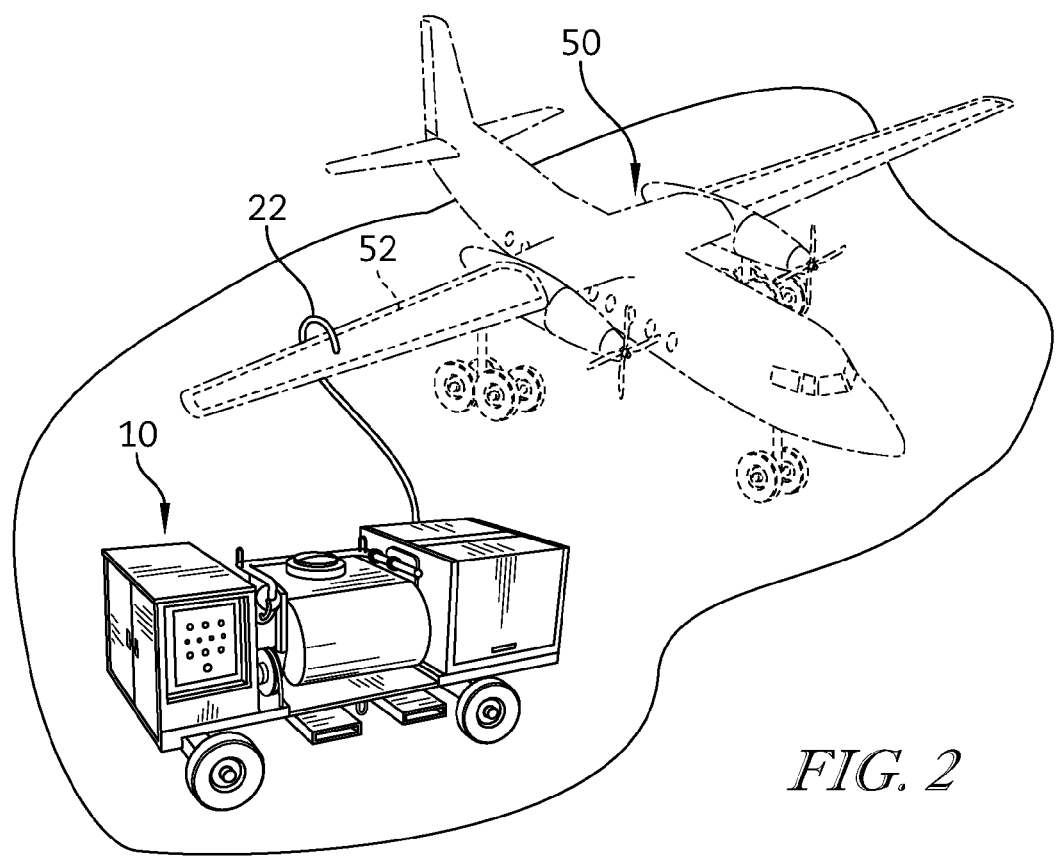
FIG. 2 is a perspective view of the pump system of FIG. 1 and an aircraft showing that the pump system is adapted to fuel and defuel the aircraft.

FIGS. 1 and 2 depict an illustrative pump system 10 in accordance with the present disclosure. The pump system 10 is adapted to control a pressure load produced at a fuel nozzle 22 of the pump system 10. More specifically, the pump system 10 is adapted to block the pressure load at the fuel nozzle 22 from exceeding a high-pressure threshold when the pump system 10 is moving fluid out of the pump system 10 through the fuel nozzle 22 and from exceeding a delta-pressure threshold when the pump system 10 is moving fluid into the pump system 10 through the fuel nozzle 22.

In the illustrative embodiment, the pump system 10 is adapted to fuel and defuel an aircraft fuel tank 50 included in an aircraft 52 as shown in FIG. 2. The pump system 10 blocks the pressure load from exceeding the high-pressure threshold to block damage to the fuel tank 50 when the pump system 10 is fueling the fuel tank 50. As an example, an excessive positive pressure load may cause the fuel tank 50 to rupture. The pump system 10 blocks the pressure load from exceeding the delta-pressure threshold to block damage to the fuel tank 50 when the pump system 10 is defueling the fuel tank 50. As an example, an excessively low pressure load may cause the fuel tank to collapse. In the illustrative embodiment, the high-pressure and delta-pressure thresholds may be adjusted between a range of values.

Figure 3:
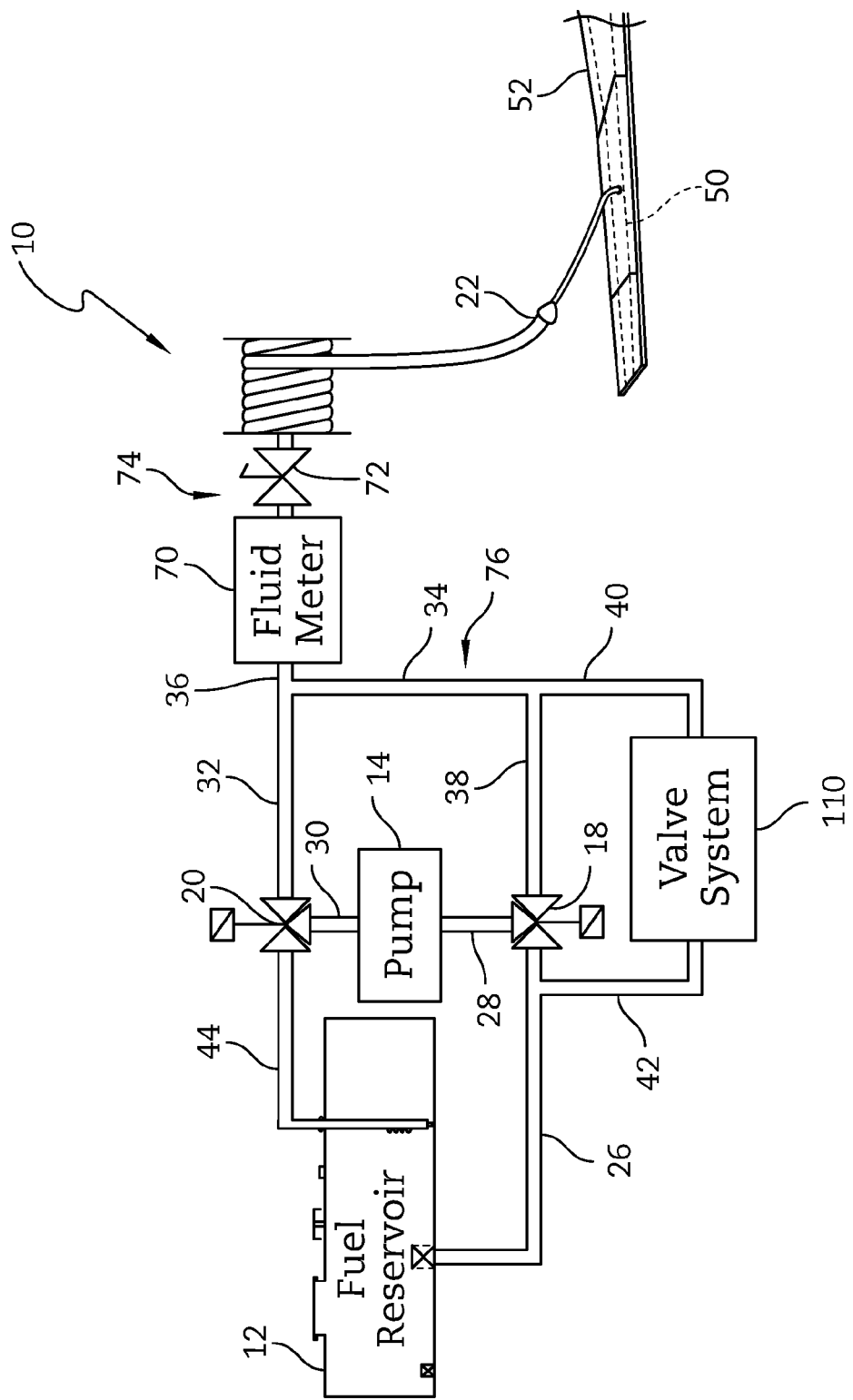
FIG. 3 is a partial diagrammatic view of a pump system of FIG. 1 showing that the pump system is used to fuel and defuel the aircraft.

A diagrammatic view of the illustrative pump system 10 is shown in FIG. 3. The illustrative pump system 10 includes a fuel reservoir 12, a single pump 14, a pump circuit 76, and valve system 110. The fuel reservoir 12 is adapted to store fuel for use in the pump system 10. The pump 14 is in fluid communication with the fuel reservoir 12 and is configured to produce a pressure difference to cause the fuel in the pump system 10 to move through the pump system 10 between the fuel reservoir 12 and the aircraft fuel tank 50. In the illustrative embodiment, the pump 14 comprises a constant volume, constant flow pump. The valve system 110 is configured to control the pressure of the fuel in the pump system 10 and block the pump system 10 from providing a pressure load at the fuel nozzle 22 that exceeds either the high-pressure threshold or the delta-pressure threshold.

The illustrative pump system 10 further includes an upstream three-way valve 18, a downstream three-way valve 20, and an aircraft interface 74 including the fuel nozzle 22 as shown in FIG. 3. The pump circuit 76 includes a plurality of conduits (sometimes called passages). The conduits are coupled with the components of the pump system 10 to provide flow paths for the fuel. The plurality of conduits include a fuel withdraw conduit 26, an upstream conduit 28, a downstream conduit 30, a fueling conduit 32, a diverting conduit 34, an interface conduit 36, a defueling conduit 38, a bypass conduit 40 (sometimes called a monitoring conduit), a relief conduit 42, and a fuel return conduit 44. In some embodiments, the fuel nozzle 22 is an end of the interface conduit 36. Illustratively, the fueling conduit 32, the diverting conduit 34, and the defueling conduit 38 cooperate to form an intermediate conduit.

In other embodiments, the pump system 10 may include additional conduits. In some embodiments, the pump system 10 includes additional components such as, for example, filters, heat exchangers, and/or fluid meters coupled in series and/or parallel with one or more of the fuel reservoir 12, the pump 14, the valve system 110, and the conduits as suggested in FIG. 3. In the illustrative embodiment, the aircraft interface 74 includes a fluid meter 70 for measuring the amount of fuel delivered to or withdrawn from the fuel tank 50 and a nozzle valve 72.

The conduits of the pump circuit 76 are coupled with the components of the pump system 10 as shown in FIG. 3. The fuel withdraw conduit 26 has a first end and a second end as shown in FIG. 3. The fuel withdraw conduit 26 (sometimes called a tank withdraw conduit) is coupled with the fuel reservoir 12 at the first end. The fuel withdraw conduit 26 is coupled with the upstream three-way valve 18 and the relief conduit 42 at the second end. Illustratively, the fuel withdraw conduit 26 includes an opening that opens into a bottom of the fuel tank.

The upstream three-way valve 18 is coupled with the fuel withdraw conduit 26, the upstream conduit 28, and the defueling conduit 38 as shown in FIG. 3. The upstream three-way valve 18 is configured to allow fuel to flow into the upstream conduit 28 from one of the fuel withdraw conduit 26 and the defueling conduit 38. The upstream three-way valve 18 blocks fuel from flowing into the upstream conduit 28 from the other of the conduits 26, 38.

In the illustrative embodiment, the upstream three-way valve 18 is controlled electronically. In particular, the upstream three-way valve 18 is moved between positions automatically by a control panel when the pump system is switched between fueling and defueling modes. In other embodiments, the upstream three-way valve 18 may be controlled manually.

The upstream conduit 28 has a first end and a second end as shown in FIG. 3. The upstream conduit 28 is coupled with the upstream three-way valve 18 at the first end. The upstream conduit 28 is coupled with a port of the pump 14 at the second end.

The downstream conduit 30 has a first end and a second end as shown in FIG. 3. The downstream conduit 30 is coupled with a port of the pump 14 at the first end. The downstream conduit 30 is coupled with the downstream three-way valve 20 at the second end.

The downstream three-way valve 20 is coupled with the fuel return conduit 44, the downstream conduit 30, and the fueling conduit 32 as shown in FIG. 3. The downstream three-way valve 20 is configured to allow the fuel to flow from the downstream conduit 30 into one of the fuel return conduit 44 and the fueling conduit 32. The downstream three-way valve 20 blocks fuel from flowing from the downstream conduit 30 into the other of the conduits 44, 32.

In the illustrative embodiment, the downstream three-way valve 20 is controlled electronically. In particular, the downstream three-way valve 20 is moved between positions automatically by a control panel when the pump system is switched between fueling and defueling modes. In other embodiments, the downstream three-way valve 20 may be controlled manually.

The fueling conduit 32 has a first end and a second end as shown in FIG. 3. The fueling conduit 32 is coupled with the downstream three-way valve 20 at the first end. The fueling conduit 32 is coupled with the diverting conduit 34 and the interface conduit 36 at the second end.

The interface conduit 36 has a first end and a second end as shown in FIG. 3. The interface conduit 36 is coupled with the fueling conduit 32 and the diverting conduit 34 at the first end. The interface conduit 36 is coupled with the fuel nozzle 22 at the second end. During fueling events, fuel from the fuel reservoir 12 flows through the interface conduit 36 and the fuel nozzle 22 of the aircraft interface 74 into the aircraft fuel tank 50. During defueling events, fuel from the aircraft fuel tank 50 flows through the fuel nozzle 22 and the interface conduit 36 into the pump system 10 and ultimately into the fuel reservoir 12.

In some embodiments, the aircraft interface 74 includes the fluid meter 70 arranged to measure the quantity of fluid entering and/or exiting the pump system 10 as shown in FIG.

3. In some embodiments, the aircraft interface 74 includes the nozzle valve 72 arranged to move between a closed position to block fluid from passing through the interface conduit 36 and an open position to allow fluid to pass through the interface conduit 36.

The defueling conduit 38 has a first end and a second end as shown in FIG. 3. The defueling conduit 38 is coupled to the diverting conduit 34 at the first end of the defueling conduit 38. The defueling conduit 38 is coupled with the upstream three-way valve 18 at the second end of the defueling conduit 38. The defueling conduit 38 is coupled with the bypass conduit 40 between the first and second ends of the defueling conduit 38. The bypass conduit 40 is coupled with the diverting conduit 34 and the defueling conduit 38 at a first end of the bypass conduit 40 and the valve system 110 at a second end of the bypass conduit 40.

The relief conduit 42 has a first end and a second end as shown in FIG. 3. The relief conduit 42 is coupled with the fuel withdraw conduit 26 at the first end of the relief conduit 42. The relief conduit 42 is coupled with the valve system 110 at the second end of the relief conduit 42. When the valve system 110 is closed, fuel is blocked from flowing between the bypass conduit 40 and the relief conduit 42. When the valve system 110 is opened, fuel is allowed to flow between the bypass conduit 40 and the relief conduit 42.

The fuel return conduit 44 has a first end and a second end as shown in FIG. 3. The fuel return conduit 44 is coupled with the downstream three-way valve 20 at the first end. The fuel return conduit 44 is coupled with the fuel reservoir 12 at the second end. Illustratively, the fuel return conduit 44 extends into a top of the fuel tank.

The valve system 110 is included in the pump system 10 to relieve the pressure load produced at the fuel nozzle 22 when the pump 14 inadvertently provides a fuel flow having a pressure that exceeds one of the high-pressure or delta-pressure thresholds. The valve system 110 is movable between a closed position and an open position. In the closed position, the valve system 110 blocks fuel flow through the valve system 110 to cause the pressure load at the fuel nozzle 22 to be unimpaired. In the open position, the valve system 110 allows fuel flow through the valve system 110 to redirect a portion of the fuel to cause the pressure load at the fuel nozzle 22 to be less than the unimpaired pressure load. In the illustrative embodiment, the valve system 110 is biased into the closed position.

Figure 4:
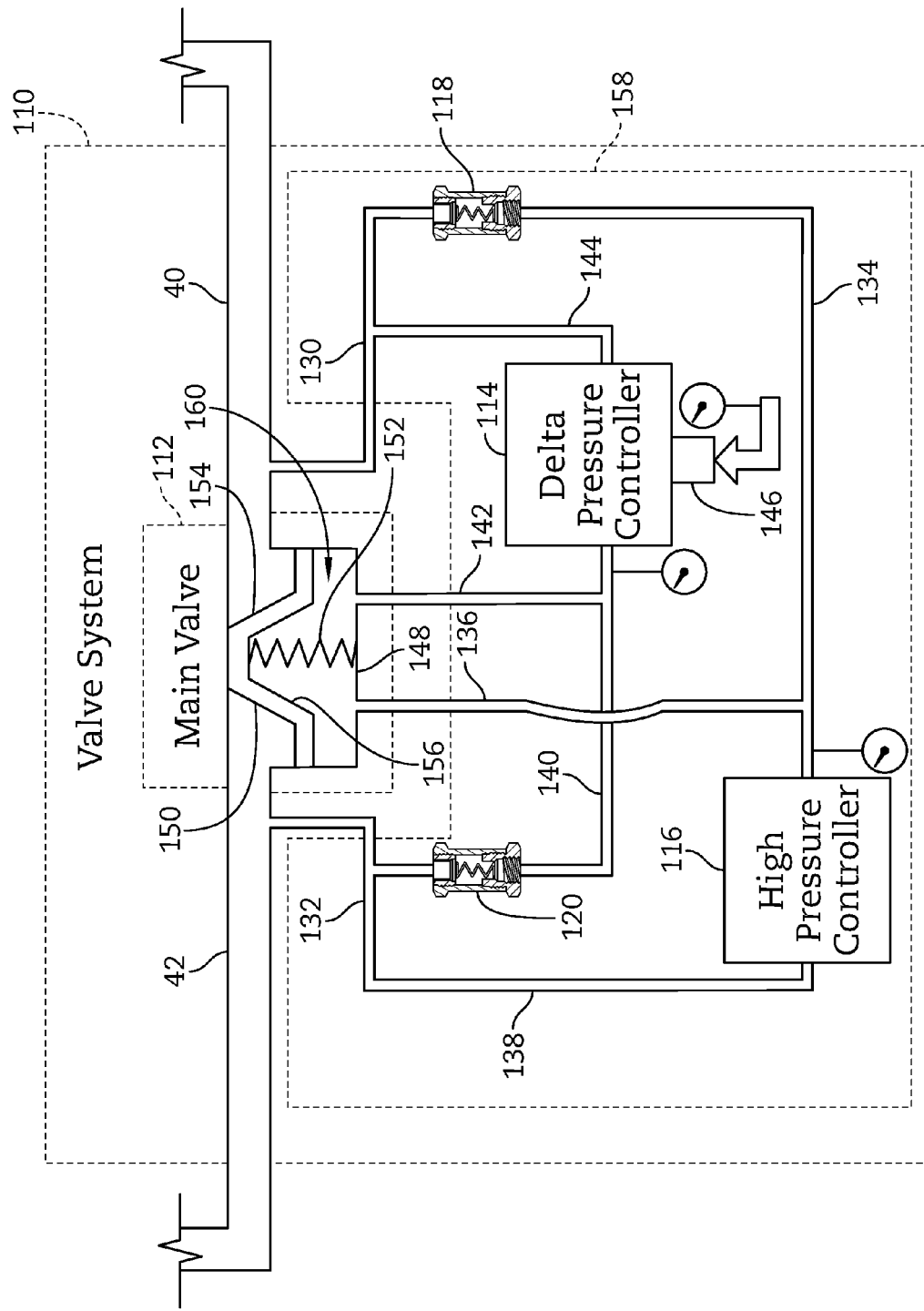
FIG. 4 is a diagrammatic view of a valve system included in the pump system of FIG. 3, the valve system being adapted to block the pump system from delivering a pressure load exceeding a high-pressure threshold and a delta-pressure threshold.

A diagrammatic view of the illustrative valve system 110 is shown in FIG. 4. The valve system 110 includes a main valve 112 and a valve control circuit 158 as shown in FIG. 4. The valve control circuit 158 illustratively includes a delta-pressure controller 114, a high-pressure controller 116, and a plurality of valve tubes. Illustratively, the valve control circuit 158 further includes a first one-way valve 118 and a second one-way valve 120 as shown in FIG. 4. Illustratively, the high-pressure controller 116 includes a high-pressure controller valve 116. Illustratively, the delta-pressure controller 114 includes a delta-pressure controller valve 114.

The main valve 112 is adapted to move between an open position and a closed position to redirect a flow of fuel in the pump system 10 to control the pressure in the pump system 10 and, thus, the pressure load at the fuel nozzle 22. The delta-pressure controller 114 is adapted to move between an open position and a closed position during a defueling event to cause the main valve 112 to move between positions and block the pressure load from exceeding the delta-pressure threshold. The high-pressure controller 116 is adapted to move between an open position and a closed position during a fueling event to cause the main valve 112 to move between positions and block the pressure load from exceeding the high-pressure threshold. The first and second one-way valves 118, 120 are adapted to block fuel from flowing into one or more of the plurality of conduits 122 to control the position of the main valve 112.

The delta-pressure controller 114 is configured to receive a pressure from the fluid in the defueling check tube 140 and the defueling sense tube 146 as shown in FIG. 3. Illustratively, the defueling sense tube 146 is in fluid communication with the fuel in the interface conduit 36 so that the defueling sense tube 146 has a pressure that is about equal to the pressure in the interface conduit 36. During a defueling event, the pressure in the interface conduit 36 is a low pressure such as, for example, below atmospheric pressure to cause the fuel in the fuel tank 50 to flow out of the fuel tank 50 and into the pump system 10. As a result, the defueling sense tube 146 has a low pressure. The pressure in the defueling check tube 140 is relatively greater than the pressure in the defueling sense tube 146. Illustratively, the pressure in the defueling check tube 140 is about equal to atmospheric pressure.

The delta-pressure controller 114 determines the difference between the pressure in the defueling check tube 140 and the defueling sense tube 146. If the difference becomes greater than the delta-pressure threshold, the delta-pressure controller 114 opens. When the delta-pressure controller 114 opens, fuel in the defueling check tube 140 flows through the delta-pressure controller 114 into the defueling relief tube 144 and is recirculated into the pump 14. As a result, the low pressure load produced at the fuel nozzle 22 is increased to block the pump system 10 from damaging the fuel tank 50. As an example, a pressure of 10 pounds per square inch below atmospheric pressure may cause the delta-pressure controller 114 to open and increase the pressure load at the fuel nozzle 22 to about 6 pounds per square inch below atmospheric pressure.

In the illustrative embodiment, the delta-pressure controller 114 is adjustable to control the delta-pressure threshold. Illustratively, the delta-pressure threshold may be adjusted between a range of about 5 pounds per square inch to about 25 pounds per square inch. In some embodiments, the delta-pressure threshold may be in a range between about 10 pounds per square inch and about 20 pounds per square inch. In some embodiments, the delta-pressure threshold is about 25 pounds per square inch.

The high-pressure controller 116 is configured to receive a pressure from the fueling check tube 134 as shown in FIG. 4. If the pressure in the fueling check tube 134 exceeds the high-pressure threshold, the high-pressure controller 116 opens to allow fuel to flow into the fueling relief tube 138 to be recirculated into the pump 14. As a result, a portion of the fuel is diverted away from the interface conduit 36 to lower the pressure load produced at the fuel nozzle 22.

In the illustrative embodiment, the high-pressure controller 116 is adjustable to control the high-pressure threshold. Illustratively, the high-pressure threshold may be adjusted between a range between about 20 pounds per square inch and about 200 pounds per square inch. In some embodiments, the high-pressure threshold is in a range between about 100 pounds per square inch and about 150 pounds per square inch. In some embodiments, the high-pressure threshold is about 200 pounds per square inch.

The valve conduits are coupled with the components to provide fluid communication between the components as shown in FIG. 4. The valve conduits 122 include a first pilot tube 130, a second pilot tube 132, a fueling check tube 134, a fueling actuator tube 136, a fueling relief tube 138, a defueling check tube 140, a defueling actuator tube 142, a defueling relief tube 144, and a defueling sense tube 146 as shown in FIG. 3.

The first pilot tube 130 has a first end and a second end as shown in FIG. 4. The first end of the first pilot tube 130 is coupled with the bypass conduit 40. The second end of the first pilot tube 130 is coupled with the first one-way valve 118 and the defueling relief tube 144.

The fueling check tube 134 has a first end, a second end, and a midsection as shown in FIG. 4. The first end of the fueling check tube 134 is coupled with the first one-way valve 118. The second end of the fueling check tube 134 is coupled with the high-pressure controller 116. The midsection of the fueling check tube 134 is coupled with the fueling actuator tube 136 at the midsection of the fueling check tube 134.

The fueling relief tube 138 has a first end and a second end as shown in FIG. 4. The first end of the fueling relief tube 138 is coupled with the high-pressure controller 116. The second end of the fueling relief tube 138 is coupled with the second pilot tube 132.

The fueling actuator tube 136 has a first end and a second end as shown in FIG. 4. The first end of the fueling actuator tube 136 is coupled with the fueling check tube 134. The second end of the fueling actuator tube 136 is coupled with the main valve 112 to be in fluid communication with the diaphragm chamber 160. In the illustrative embodiment, the fueling actuator tube 136 is in fluid communication with the defueling actuator tube 142 through the main valve 112.

The second pilot tube 132 has a first end and a second end as shown in FIG. 4. The first end of the second pilot tube 132 is coupled with the relief conduit 42. The second end of the second pilot tube 132 is coupled with the second one-way valve 120 and the fueling relief tube 138.

The defueling check tube 140 has a first end, a second end, and a midsection as shown in FIG. 4. The first end of the defueling check tube 140 is coupled with the second one-way valve 120. The second end of the defueling check tube 140 is coupled with the delta-pressure controller 114. The midsection of the defueling check tube 140 is coupled with the defueling actuator tube 142.

The defueling relief tube 144 has a first end and second end as shown in FIG. 4. The first end of the defueling relief tube 144 is coupled with the delta-pressure controller 114. The second end of the defueling relief tube 144 is coupled with the first pilot tube 130.

The defueling actuator tube 142 has a first end and a second end as shown in FIG. 4. The first end of the defueling actuator tube 142 is coupled with the defueling check tube 140. The second end of the defueling actuator tube 142 is coupled with the main valve 112 to be in fluid communication with the diaphragm chamber 160. In the illustrative embodiment, the defueling actuator tube 142 is in fluid communication with the fueling actuator tube 136 through the main valve 112.

The defueling sense tube 146 is coupled to the delta-pressure controller 114 at a first end of the defueling sense tube 146. The defueling sense tube 146 is in fluid communication with the interface conduit 36 at a second end of the defueling sense tube 146.

The first one-way valve 118 is configured to allow fluid to flow from the first pilot tube 130 into the fueling check tube 134. The first one-way valve 118 is configured to block fluid from flowing from the fueling check tube 134 into the first pilot tube 130.

The second one-way valve 120 is configured to allow fluid to flow from the second pilot tube 132 into the defueling check tube 140. The second one-way valve 120 is configured to block fluid from flowing from the defueling check tube 140 into the second pilot tube 132.

The main valve 112 is coupled with the bypass conduit 40 and the relief conduit 42. The main valve 112 is movable between an open position and a closed position. When the main valve 112 is in the open position, fuel is allowed to flow through the main valve 112 between the bypass conduit 40 and the relief conduit 42. When the main valve 112 is in the closed position, fuel is blocked from flowing through the main valve 112 between the bypass conduit 40 and the relief conduit 42.

Figure 6:
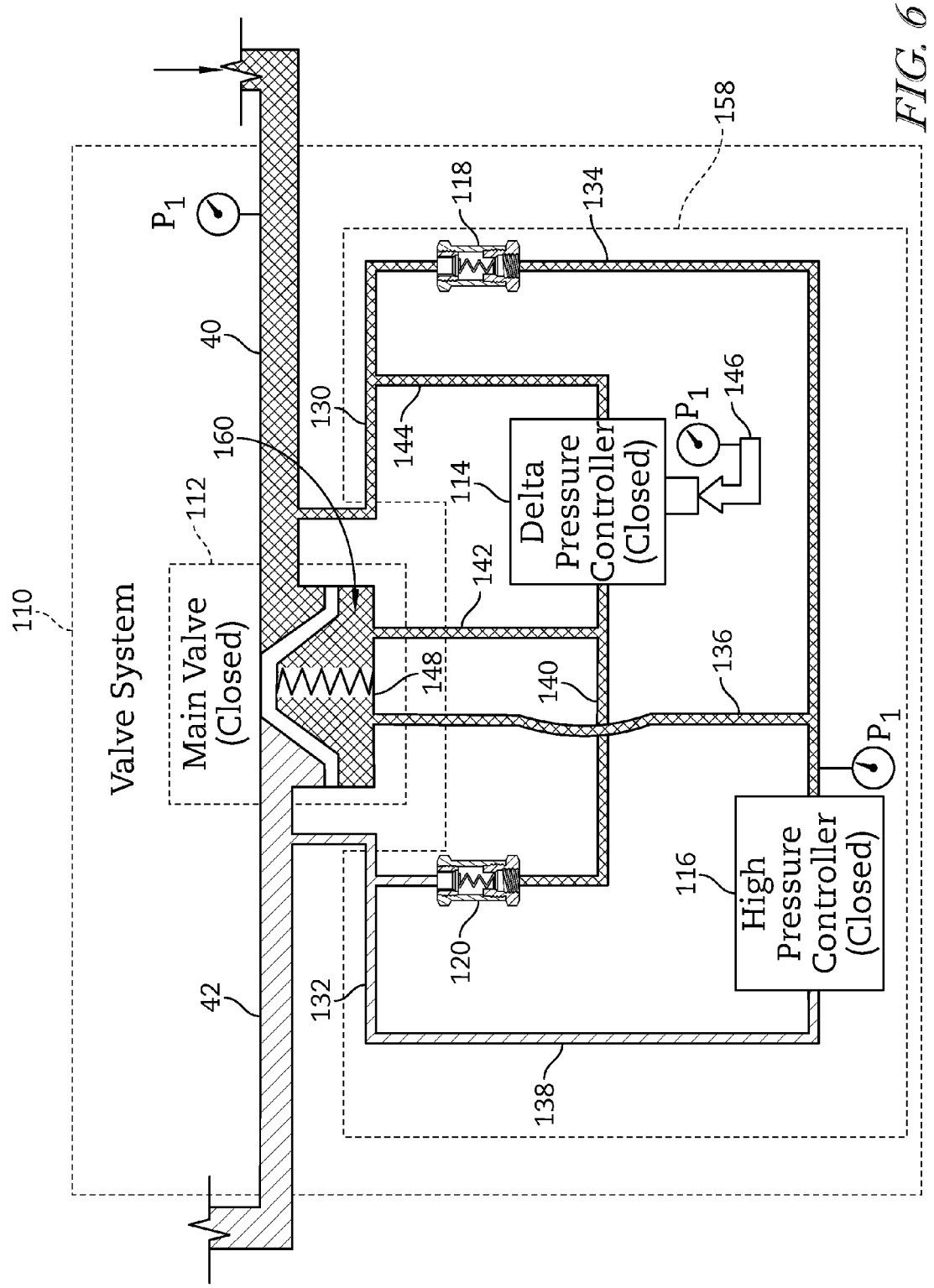
FIG. 6 is a partial diagrammatic view of the valve system of FIG. 4 during a fueling event below the high-pressure threshold.
Figure 8:
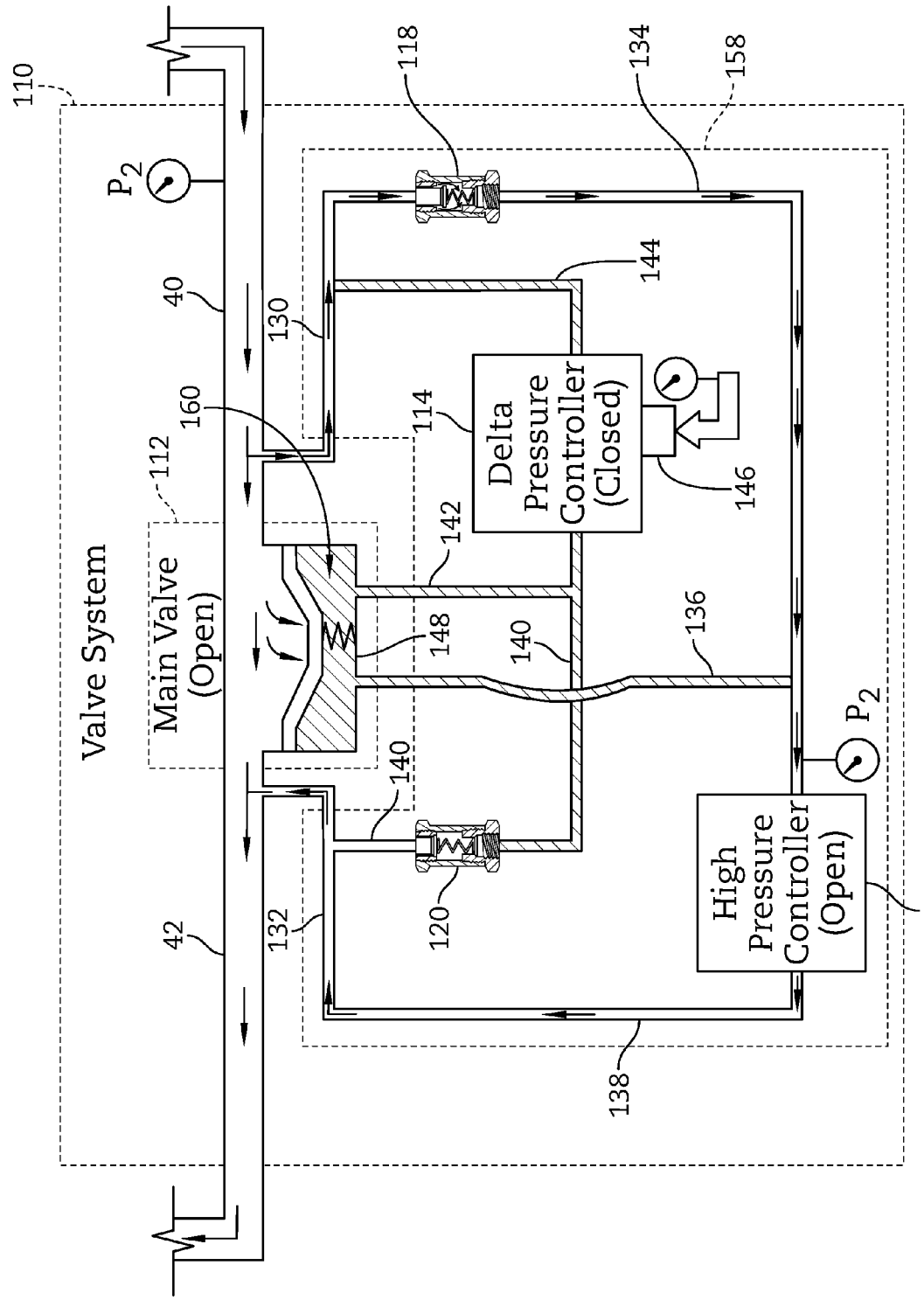
FIG. 8 is a partial diagrammatic view of the valve system of FIG. 4 during a fueling event where the pump system is blocked from delivering a pressure load exceeding the high-pressure threshold.

Illustratively, the main valve 112 comprises an automatic control valve. In the illustrative embodiment, the main valve 112 comprises a hydraulic diaphragm valve. Illustratively, the main valve 112 includes a housing 148, a diaphragm 150, and a bias member 152 as shown in FIG. 4. The housing 148 is arranged around the diaphragm 150 and the bias member 152. The diaphragm 150 is coupled to the housing 148 to form a diaphragm chamber 160 as shown in FIG. 4. The diaphragm 150 is configured to move within the housing 148 to block the flow of fuel, as shown in FIG. 6 and to allow the fuel to flow, as shown in FIG. 8. The bias member 152 biases the diaphragm 150 into the closed position to block the flow of fuel.

The diaphragm 150 includes an inner surface 154 and an outer surface 156 as shown in FIG. 4. The inner surface 154 is configured to engage and disengage the housing 148 to close and open the main valve 112. The outer surface 156 is acted on by the bias member 152 and fuel in the valve system 110 to cause the diaphragm 150 to move relative to the housing 148.

When the pressure of the fluid applied to the outer surface 156 of the diaphragm is about equal to or greater than the pressure of the fluid applied to the inner surface 154, the bias member 152 and the pressure on the outer surface 156 cause the diaphragm 150 to move and the inner surface 154 to engage the housing 148 and block the flow of fuel between the bypass conduit 40 and the relief conduit 42 as shown in FIG. 6. When the pressure of the fluid applied to the outer surface 156 of the diaphragm is less than the pressure of the fluid applied to the inner surface 154, the pressure on the inner surface 154 overcomes the bias member 152 and causes the diaphragm 150 to move and the inner surface 154 to disengage the housing 148 to allow the flow of fuel between the bypass conduit 40 and the relief conduit 42 as shown in FIG. 8.

Figure 5:
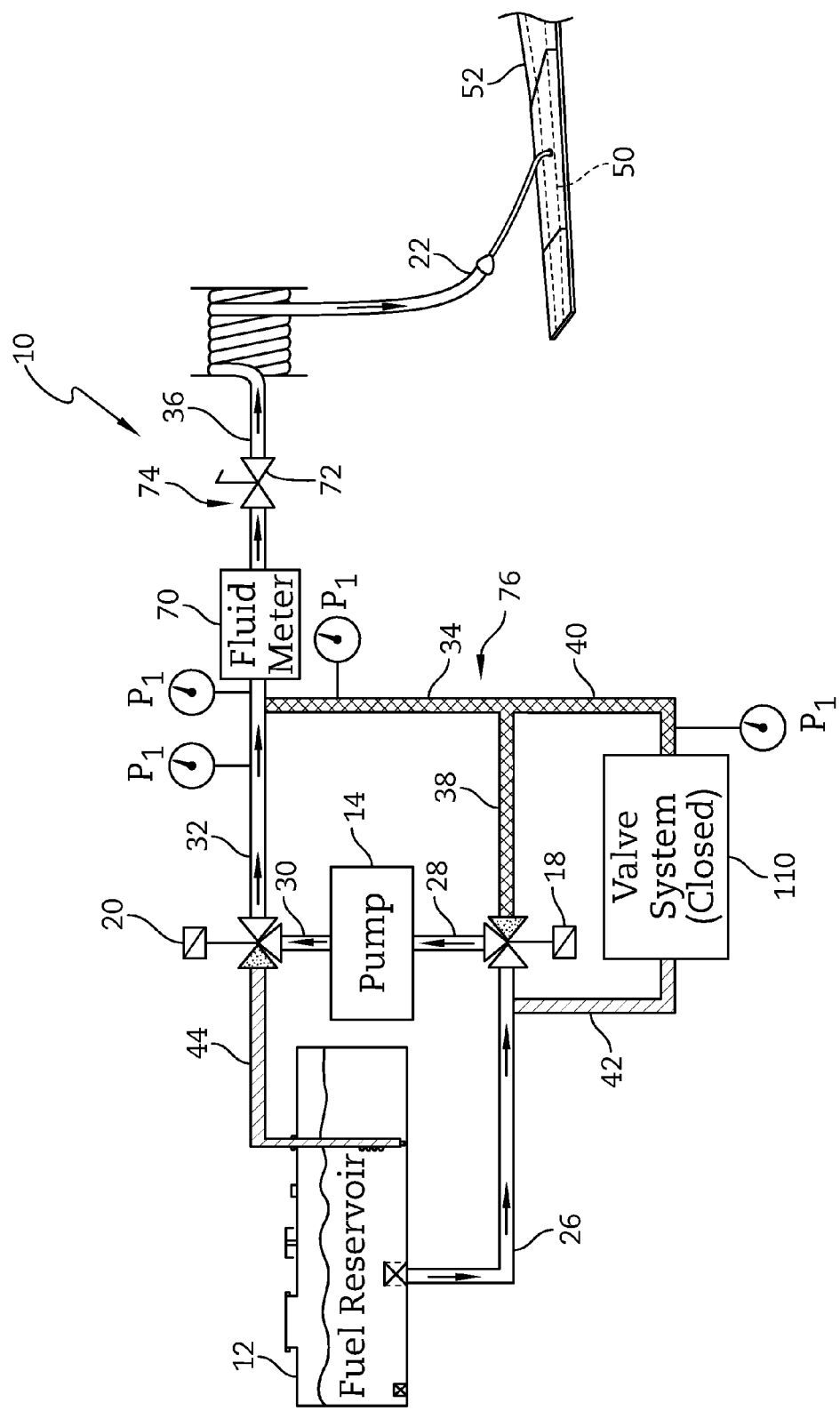
FIG. 5 is a partial diagrammatic view of the pump system of FIG. 3 during a fueling event below the high-pressure threshold.

In a fueling event such as, for example, when the pump system 10 is used to add fuel to the fuel tank 50 of the aircraft 52, the pump system 10 is switched to a fueling mode as shown in FIG. 5. In the fueling mode, the pump system 10 is arranged to provide fuel from the fuel reservoir 12 to the aircraft fuel tank 50 of the aircraft 52 through a fuel path formed from the plurality of conduits. The pump system 10 is configured to control the pressure load delivered to the fuel tank 50 and block the pressure load from exceeding the high-pressure threshold to block damage to the fuel tank 50.

An illustrative fueling event, in which the pressure load is maintained below the high-pressure threshold, is shown in FIG. 5. The fuel path includes the fuel withdraw conduit 26, the upstream three-way valve 18, the upstream conduit 28, the pump 14, the downstream conduit 30, the downstream three-way valve 20, the fueling conduit 32, and the interface conduit 36 as suggested with arrows in FIG. 5.

To switch the pump system 10 to the fueling mode, the upstream three-way valve 18 is adjusted to allow fuel to flow from the fuel withdraw conduit 26 into the upstream conduit 28 as suggested in FIG. 5. The upstream three-way valve 18 blocks fuel from flowing from the defueling conduit 38 into the upstream conduit 28 as shown in FIG. 5. The downstream three-way valve 20 is adjusted to allow fuel to flow from the downstream conduit 30 into the fueling conduit 32. The downstream three-way valve 20 blocks fuel from flowing from the downstream conduit 30 into the fuel return conduit 44 as shown in FIG. 5. The valve system 110 is in the closed position to block fuel from flowing between the bypass conduit 40 and the relief conduit 42.

During the fueling event, the pump 14 is activated to cause the fuel stored in the fuel reservoir 12 to move from the fuel reservoir 12 through the fuel withdraw conduit 26 into the upstream three-way valve 18 as shown in FIG. 5. Fuel is blocked from flowing from the fuel withdraw conduit 26 into the relief conduit 42 because the valve system 110 is closed as shown in FIG. 5. The fuel continues to flow through the upstream conduit 28 into the pump 14 from the upstream three-way valve 18. The upstream three-way valve 18 blocks fuel from flowing from the fuel withdraw conduit 26 into the defueling conduit 38.

The fuel flows from the pump 14 through the downstream conduit 30 and downstream three-way valve 20 into the fueling conduit 32 as shown in FIG. 5. The downstream three-way valve 20 blocks fuel from flowing from the downstream conduit 30 into the fuel return conduit 44. The pump 14 provides fuel to the fueling conduit 32 having a pressure $P_1$. The fuel is blocked from flowing from the fueling conduit 32 into the diverting conduit 34 as described below. As such, the fuel flows from the fueling conduit 32 into the interface conduit 36 and exits the pump system 10 through the fuel nozzle 22 into the fuel tank 50. The fuel provided to the fuel nozzle 22 has a pressure that is about equal to the pressure $P_1$.

Fuel is blocked from flowing from the fueling conduit 32 into the diverting conduit 34 as shown in FIG. 5. The fuel in the diverting conduit 34 splits into the defueling conduit 38 and the bypass conduit 40. The upstream three-way valve 18 blocks fuel from moving out of the defueling conduit 38 into the upstream conduit 28. The valve system 110 is closed and blocks fuel from flowing from the bypass conduit 40 into the relief conduit 42. As such, the fuel in the diverting conduit 34, the defueling conduit 38, and the bypass conduit 40 is blocked from moving out of the conduits. As a result, the fuel in the diverting conduit 34, the defueling conduit 38, and the bypass conduit 40 has a pressure that is about equal to the pressure $P_1$.

Because the diverting conduit 34 is blocked, the fuel flowing from the fueling conduit 32 through the interface conduit 36 is unimpaired. As such, the fuel exiting the interface conduit 36 has a pressure that is about equal to the pressure $P_1$, which is below the high-pressure threshold.

During a fueling event, the valve system 110 is acted on by the pressure of the fuel in the bypass conduit 40 and is configured to open and relieve the pressure if the pressure exceeds the high-pressure threshold. During the fueling event shown in FIG. 5, the pressure load remains below the high-pressure threshold. As a result, the valve system 110 remains closed during the fueling event as shown in FIG. 6.

During the fuel event, in which the pressure load remains below the high-pressure threshold, the fuel in the bypass conduit 40 applies a pressure load to the fuel in the valve system 110 as shown in FIG. 6. The fuel in the main valve 112 has a pressure about equal to the pressure $P_1$ as shown in FIG. 6.

The pressure load is applied to the fuel in the first pilot tube 130 and to the fuel in the defueling relief tube 144. The fuel in the defueling relief tube 144 is blocked from flowing out of the defueling relief tube 144 by the closed delta-pressure controller 114. The pressure load is applied through the fueling check tube 134. Because the pressure $P_1$ of the fuel is below the high-pressure threshold, the high-pressure controller 116 is closed and the fuel is blocked from flowing out of the fueling check tube 134 into the fueling relief tube 138. As such, the pressure load is applied through the fueling actuator tube 136 and into the main valve 112.

The pressure load is applied through the main valve 112 and the defueling actuator tube 142. The fuel in the defueling actuator tube 142 is blocked from flowing through the closed delta-pressure controller 114 into the defueling relief tube 144. The pressure load is applied through the defueling check tube 140. The fuel in the defueling check tube is blocked from flowing into the second pilot tube 132 by the second one-way valve 120. As such, the pressure of the fuel in those conduits remains at about the pressure $P_1$ as shown in FIG. 6.

As a result, the fuel in the main valve 112 has about the pressure $P_1$. The fuel and the bias member apply pressure to the outer surface 156 of the diaphragm 150. The fuel in the bypass conduit 40 and the main valve 112 has a pressure of about pressure $P_1$. The fuel in the bypass conduit 40 applies pressure to the inner surface 154 of the diaphragm 150. Because the pressure on the inner surface 154 is about equal to the pressure on the outer surface 156, the force on the inner surface 154 is less than the force of the fuel and bias member 152 acting on the outer surface 156 and the main valve 112 remains in the closed position. In the closed position the fuel in the bypass conduit 40 is blocked from flowing through the main valve 112 into the relief conduit 42. As a result, the fuel path is unimpaired, as shown in FIG. 5 and the pump system 10 delivers fuel to the fuel nozzle 22 at a pressure load of about pressure $P_1$ that does not exceed the high-pressure threshold.

Figure 7:
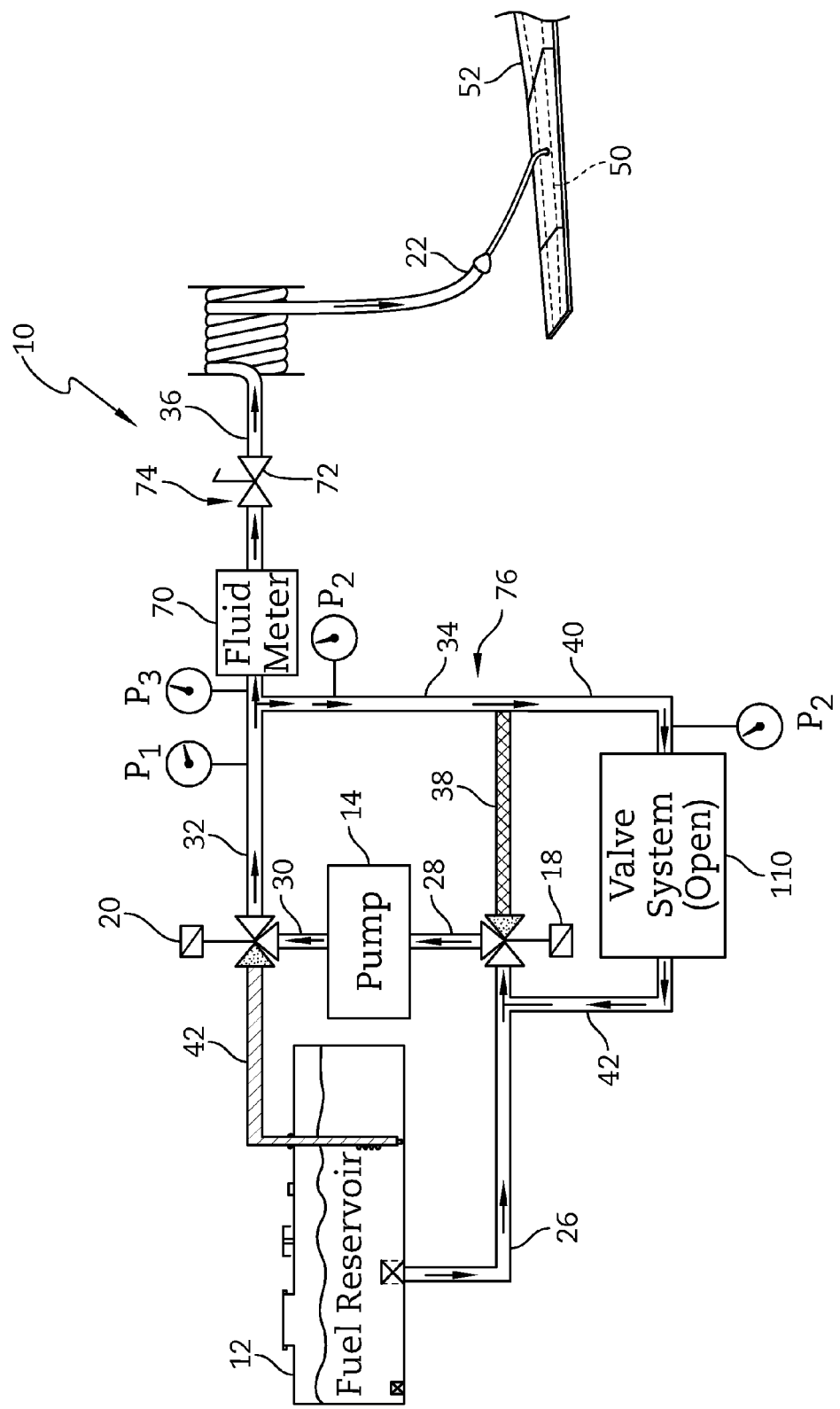
FIG. 7 is a partial diagrammatic view of the pump system of FIG. 3 during a fueling event where the pump system is blocked from delivering a pressure load exceeding the high-pressure threshold.

During a fueling event, the pressure of the fuel in the pump system 10 may inadvertently increase to create a high-pressure fueling event shown in FIGS. 7 and 8. In a high-pressure fueling event, the pressure in the pump system 10 is equal to or greater than the high-pressure threshold. As a result, the valve system 110 moves to the open position to cause fuel to flow into the diverting conduit 34 from the fueling conduit 32 to lower the pressure load delivered to the fuel nozzle 22 to a pressure below the high-pressure threshold as shown in FIG. 7. In the illustrative embodiment, the valve system 110 is configured to move between the open and closed positions automatically.

As shown in FIG. 7, the pump 14 produces a flow of fuel having a pressure $P_1$. In a high-pressure fueling event, the pressure $P_1$ exceeds the high-pressure threshold. The pump 14 provides fuel to the fueling conduit 32 having a pressure of about pressure $P_1$ as shown in FIG. 7. As discussed below, a portion of the fuel in the fueling conduit 32 flows into the interface conduit 36 and another portion of the fuel in the fueling conduit 32 flows into the diverting conduit 34 to lower the pressure of the fuel flowing into the interface conduit 36. The pressure $P_1$ of the fuel in the fueling conduit 32 is split between the diverting conduit 34 and the interface conduit 36. As a result, the pressure of the fuel flowing into the interface conduit 36 is less than the pressure $P_1$ and less than the high-pressure threshold.

The pressure $P_1$ of the fuel in the fueling conduit 32 is applied through the diverting conduit 34, the bypass conduit 40, and the valve system 110 as shown in FIG. 7. The valve system 110 opens as a result of the high pressure to allow fuel from the fueling conduit 32 to be diverted through the diverting conduit 34, the bypass conduit 40, and the valve system 110. As a result, a portion of the fuel in the fueling conduit 32 flows into the diverting conduit 34 and another portion of the fuel in the fueling conduit 32 flows into the interface conduit 36.

With the valve system 110 open, the fuel in the bypass conduit 40 flows through the valve system 110 into the relief conduit 42. The fuel in the relief conduit 42 joins the fuel from the fuel reservoir 12 in the fuel withdraw conduit 26 and is recirculated through the pump system 10. The portion of fuel that flows into the interface conduit 36 is delivered to the fuel tank 50 through the fuel nozzle 22 at a lower pressure.

Because the flow of fuel in the fueling conduit 32 splits, the fuel flowing into the bypass conduit 40 has a pressure $P_2$ as shown in FIG. 7. The fuel that flows through the interface conduit 36 has a pressure $P_3$. The pressure $P_3$ is less than the pressure $P_1$ and the pressure $P_3$ is below the high-pressure threshold. In the illustrative embodiment, the pressure $P_1$ is about equal to the sum of the pressure $P_2$ and the pressure $P_3$.

During a high-pressure fueling event, the valve system 110 is acted on by the pressure of the fuel in the bypass conduit 40 as shown in FIG. 6. As a result of the pressure exceeding the high-pressure threshold, the valve system 110 opens to reduce the pressure of fuel directed into the interface conduit 36 as shown in FIGS. 7 and 8. In particular, the pressure of the fuel in the bypass conduit 40 is applied through the valve system 110 which causes the high-pressure controller 116 in the valve system 110 to open. Once the high-pressure controller 116 opens, the main valve 112 opens to allow the fuel in the bypass conduit 40 to flow into the relief conduit 42 to be recirculated by the pump 14.

When a high pressure fueling event first occurs, the pressure in the bypass conduit 40 is about equal to pressure $P_1$ as shown in FIG. 6. Similar to the discussion above regarding a fueling event where the pressure load is below the high-pressure threshold, the pressure $P_1$ is applied through the first pilot tube 130, the defueling relief tube 144, the fueling check tube 134, the fueling actuator tube 136, the main valve 112, the defueling actuator tube 142, and the defueling check tube 140.

Because the pressure $P_1$ of the fuel is above the high-pressure threshold in a high pressure fueling event, the high-pressure controller 116 opens and the fuel is allowed to flow out of the fueling check tube 134 into the fueling relief tube 138. The fuel flows from the fueling relief tube 138 into the second pilot tube 132 and into the relief conduit 42 as shown in FIG. 8. As such, the pressure in the fueling actuator tube 136 and into the main valve 112 is reduced.

As a result, the fuel in the main valve 112 has a pressure of about pressure that is less than the pressure $P_1$. The fuel applies the pressure to the outer surface 156 of the diaphragm 150. The fuel in the bypass conduit 40 and the main valve 112 has a pressure of about pressure $P_1$. The fuel applies the pressure to the inner surface 154 of the diaphragm 150. Because the force on the inner surface 154 is greater than the force on the outer surface 156, the force on the inner surface 154 overcomes the bias member 152 and causes the diaphragm 150 to move and the main valve 112 to be in the open position as shown in FIG. 8.

In the open position, the fuel in the bypass conduit 40 is allowed to flow through the main valve 112 into the relief conduit 42. As a result, a portion of the high-pressure fuel in the fueling conduit 32 is diverted into the diverting conduit 34. It then flows into the bypass conduit 40 and through the main valve 112. It continues into the relief conduit 42 and is then recirculated into the pump 14. Because a portion of the high-pressure fuel in the fueling conduit 32 is diverted through the valve system 110, the pump system 10 delivers fuel to the fuel nozzle 22 at a pressure load of about pressure $P_3$ that is below the high-pressure threshold.

In a defueling event such as, for example, when the pump system 10 is used to remove fuel from the fuel tank 50 of the aircraft 52, the pump system 10 is switched to a defueling mode. In the defueling mode, the pump system 10 is arranged to remove fuel from the aircraft fuel tank 50 of the aircraft 52 and provide the fuel to the fuel reservoir 12 through a defuel path formed from the plurality of conduits as shown in FIG. 9.

To remove fuel from the aircraft fuel tank 50, the pump system 10 provides a relatively pressure load at the fuel nozzle 22 to pump fuel out of the tank 50. If the low pressure is extreme, the pump system 10 may damage the fuel tank 50 such as, for example, by causing the fuel tank 50 to collapse. The pump system 10 is configured to control the pressure load delivered to the fuel tank 50 and block the pressure load from exceeding the delta-pressure threshold to block damage to the fuel tank 50.

Figure 9:
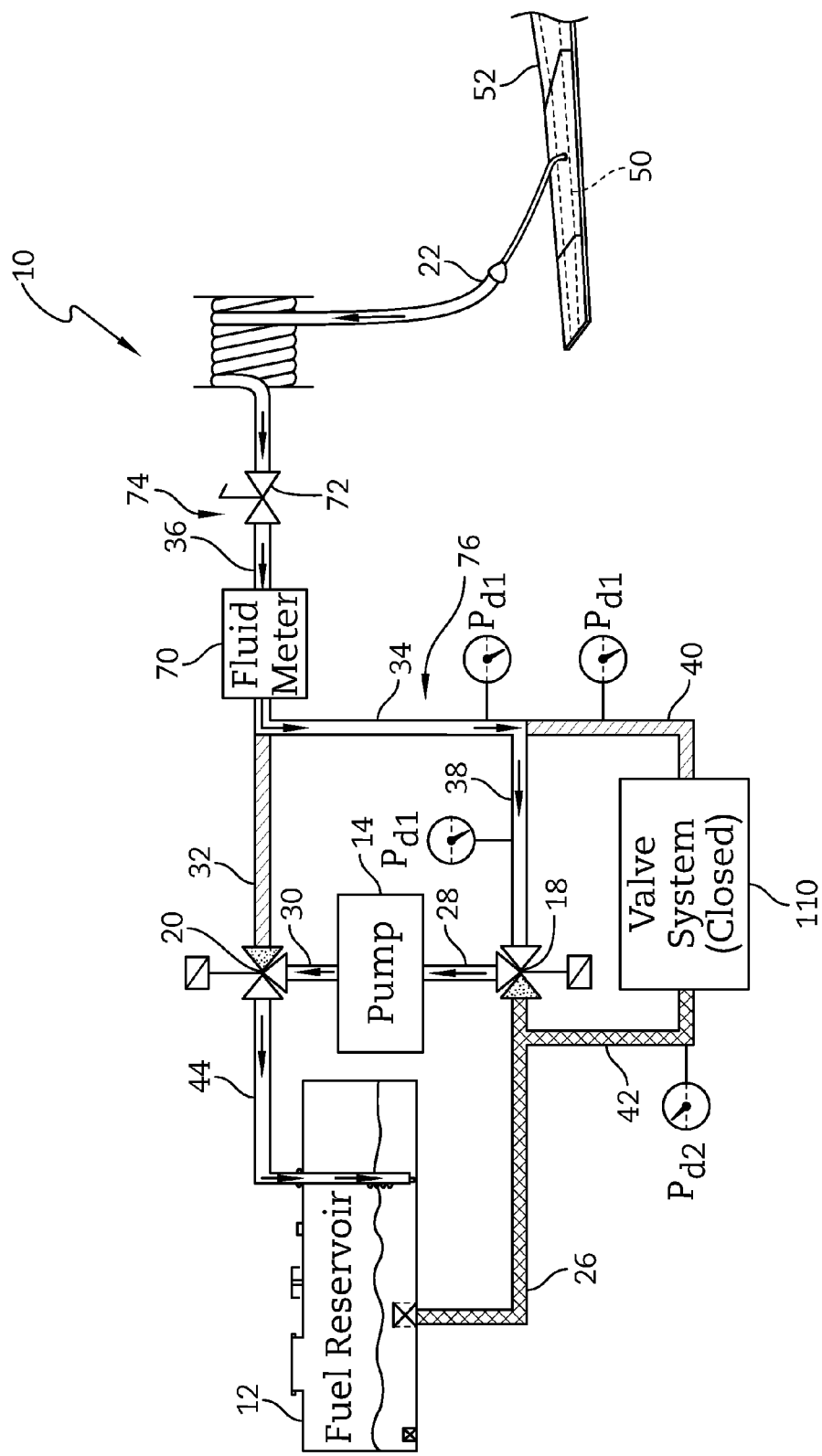
FIG. 9 is a partial diagrammatic view of the pump system of FIG. 3 during a defueling event below the delta-pressure threshold.

An illustrative defueling event, in which the pressure load does not exceed the delta-pressure threshold, is shown in FIG. 9. The defuel path includes the interface conduit 36, the diverting conduit 34, the defueling conduit 38, the upstream three-way valve 18, the upstream conduit 28, the pump 14, the downstream conduit 30, the downstream three-way valve 20, and the fuel return conduit 44 as suggested with arrows in FIG. 9.

To switch the pump system 10 to the defueling mode, the upstream three-way valve 18 is adjusted to allow fuel to flow from the defueling conduit 38 into the upstream conduit 28 as suggested in FIG. 9. The upstream three-way valve 18 blocks fuel from flowing from the defueling conduit 38 into the fuel withdraw conduit 26. The downstream three-way valve 20 is adjusted to allow fuel to flow from the downstream conduit 30 into the fuel return conduit 44. The downstream three-way valve 20 blocks fuel from flowing from the downstream conduit 30 into the fueling conduit 32. The valve system 110 is in the closed position to block fuel from flowing between the relief conduit 42 and the bypass conduit 40.

During the defueling event, the pump 14 is activated to provide a low pressure in the upstream conduit 28 that draws fuel from the fuel tank 50 of the aircraft 52 into the pump 14 as discussed below and shown in FIG. 9. The pump 14 then pumps the fuel into the fuel reservoir 12.

The pump 14 provides a low pressure in the upstream conduit 28 to draw fuel located upstream of the upstream conduit 28 into the pump 14 as shown in FIG. 9. As a result, the fuel in the defueling conduit 38 flows through the upstream three-way valve 18 and into to the upstream conduit 28. The fuel in the bypass conduit 40 is blocked from flowing into the defueling conduit 38 because the valve system 110 is closed. The fuel in the fueling conduit 32 is blocked from flowing to the pump 14 because the first end of the fueling conduit 32 is blocked by the downstream three-way valve 20. The fuel in the fuel tank 50 is able to flow through the fuel nozzle 22 and the conduits 36, 34, 28 into the pump 14 as shown in FIG. 9.

The fuel flows from the pump 14 through the downstream conduit 30 and downstream three-way valve 20 into the fuel return conduit 44 as shown in FIG. 9. The downstream three-way valve 20 blocks fuel from flowing from the downstream conduit 30 into the fueling conduit 32.

Figure 10:
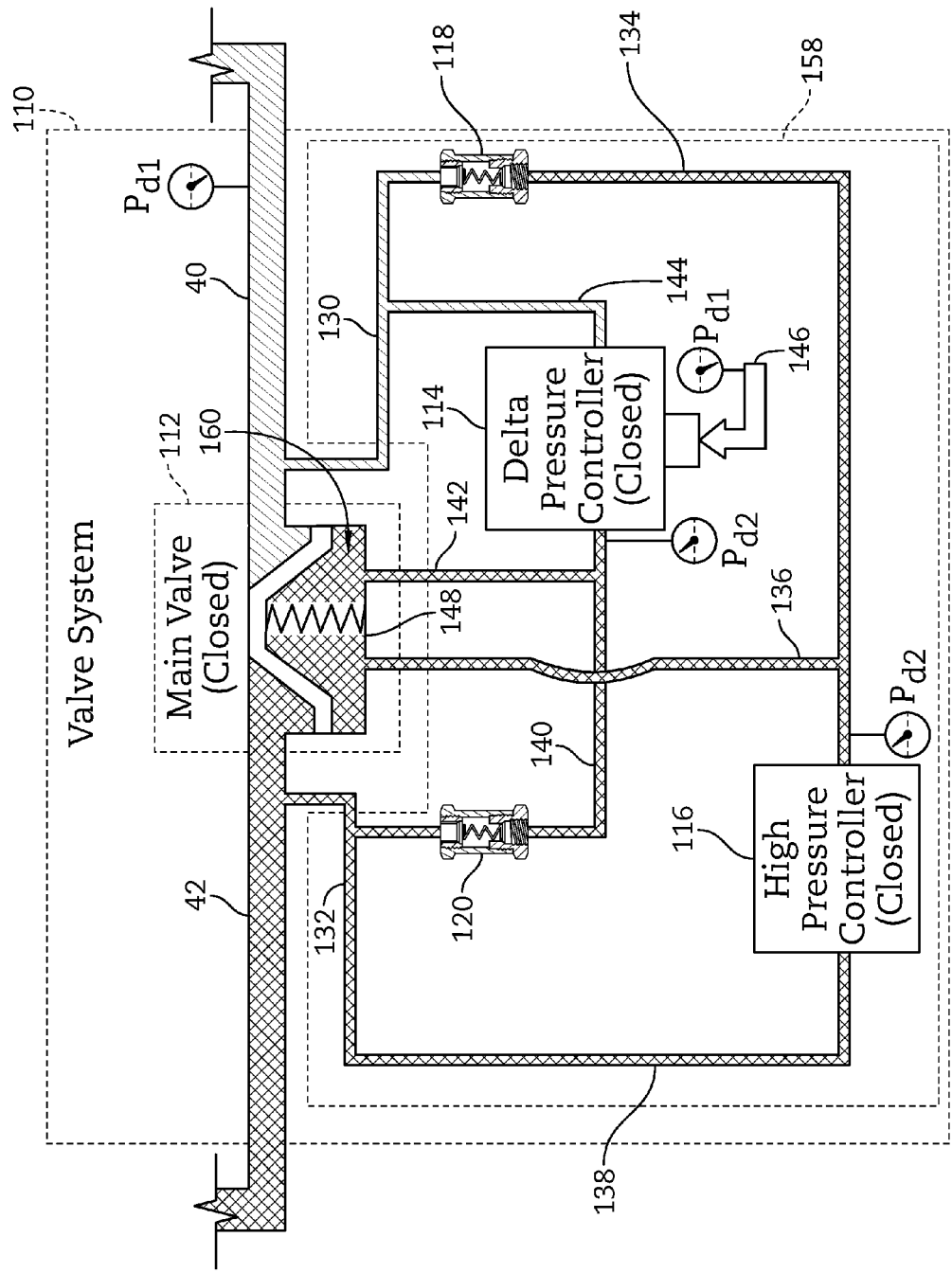
FIG. 10 is a partial diagrammatic view of the valve system of FIG. 4 during a defueling event below the delta-pressure threshold.

The pump 14 provides a draw on the upstream conduit 28 having a pressure $P_{d1}$. In the illustrative embodiment, the pressure $P_{d1}$ is less than the ambient pressure in the fuel tank 50 as shown in FIGS. 9 and 10. As such, the pump 14 provides a pressure load at the fuel nozzle 22 that is about equal to the pressure $P_{d1}$.

The fuel in the fuel reservoir 12 applies a pressure $P_{d2}$ to the fuel in the fuel withdraw conduit 26 and relief conduit 42 as shown in FIG. 9. Illustratively, the pressure $P_{d2}$ applied to the fuel withdraw conduit 26 and relief conduit 42 is about equal to ambient pressure. As shown in FIG. 9, the pressure $P_{d2}$ in the relief conduit 42 is greater than the pressure $P_{d1}$ in the bypass conduit 40. Because the pressure $P_{d2}$ is does not exceed the delta-pressure threshold, the valve system 110 is closed and blocks the fuel in the relief conduit 42 from flowing through the main valve 112 into the bypass conduit 40.

During a defueling event, the valve system 110 is acted on by the pressure of the fuel in the relief conduit 42, the low pressure of the fuel in the defuel path, and the low pressure in the defueling sense tube 146 as shown in FIG. 9. The valve system 110 is configured to remain closed while the pressure load does not exceed the delta-pressure threshold and to open if the pressure exceeds the delta-pressure threshold. During the defueling event shown in FIG. 9, the pressure load does not exceed the delta-pressure threshold. As a result, the valve system 110 remains closed as shown in FIG. 10.

During the defuel event shown in FIGS. 9 and 10, the fuel in the relief conduit 42 applies a pressure load to the fuel in the valve system 110 as shown in FIG. 10. The fuel in the main valve 112 has a pressure about equal to the pressure $P_{d2}$ as shown in FIGS. 9 and 10.

The pressure $P_{d2}$ is applied to the second pilot tube 132 and to the fueling relief tube 138 as shown in FIG. 10. The fuel in the fueling relief tube 138 is blocked from flowing out of the fueling relief tube 138 by the closed high-pressure controller 116. The pressure $P_{d2}$ is applied through the second one-way valve 120 and the defueling check tube 140. Because the difference between the pressure $P_{d2}$ of the fuel in the defueling check tube 140 and the pressure of the fuel in the defueling sense tube 146 is below the delta-pressure threshold, the delta-pressure controller 114 is closed and the fuel is blocked from flowing out of the defueling check tube 140 into the defueling relief tube 144. As such, the pressure $P_{d2}$ is applied through the defueling actuator tube 142 and into the main valve 112.

The pressure $P_{d2}$ is applied through the main valve 112 and the fueling actuator tube 136. The fuel in the fueling actuator tube 136 is blocked from flowing through the closed high-pressure controller 116 into the fueling relief tube 138. The pressure $P_{d2}$ is applied through the fueling check tube 134. The fuel in the fueling check tube 134 is blocked from flowing into the first pilot tube 130 by the first one-way valve 118. As such, the pressure of the fuel in those conduits remains at about the pressure $P_{d2}$.

As a result, the fuel in the main valve 112 has a pressure of about pressure $P_{d2}$. The fuel in the defueling actuator tube 142 and main valve 112 applies the pressure to the outer surface 156 of the diaphragm 150. The fuel in the bypass conduit 40 has a pressure of about pressure $P_{d1}$. The fuel applies the pressure $P_{d1}$ to the inner surface 154 of the diaphragm 150. The pressure $P_{d2}$ is greater than the pressure $P_{d1}$ as shown in FIG. 10. As such, the force of fuel on the inner surface 154 is less than the force from the fuel and the bias member on the outer surface 156. As a result, the main valve 112 is in the closed position. In the closed position the fuel in the bypass conduit 40 is blocked from flowing through the main valve 112 into the relief conduit 42. The defuel path is maintained, as shown in FIG. 9 and the pump system 10 delivers fuel to the fuel nozzle 22 at a pressure load of about pressure $P_{d1}$ that does not exceed the delta-pressure threshold.

Figure 11:
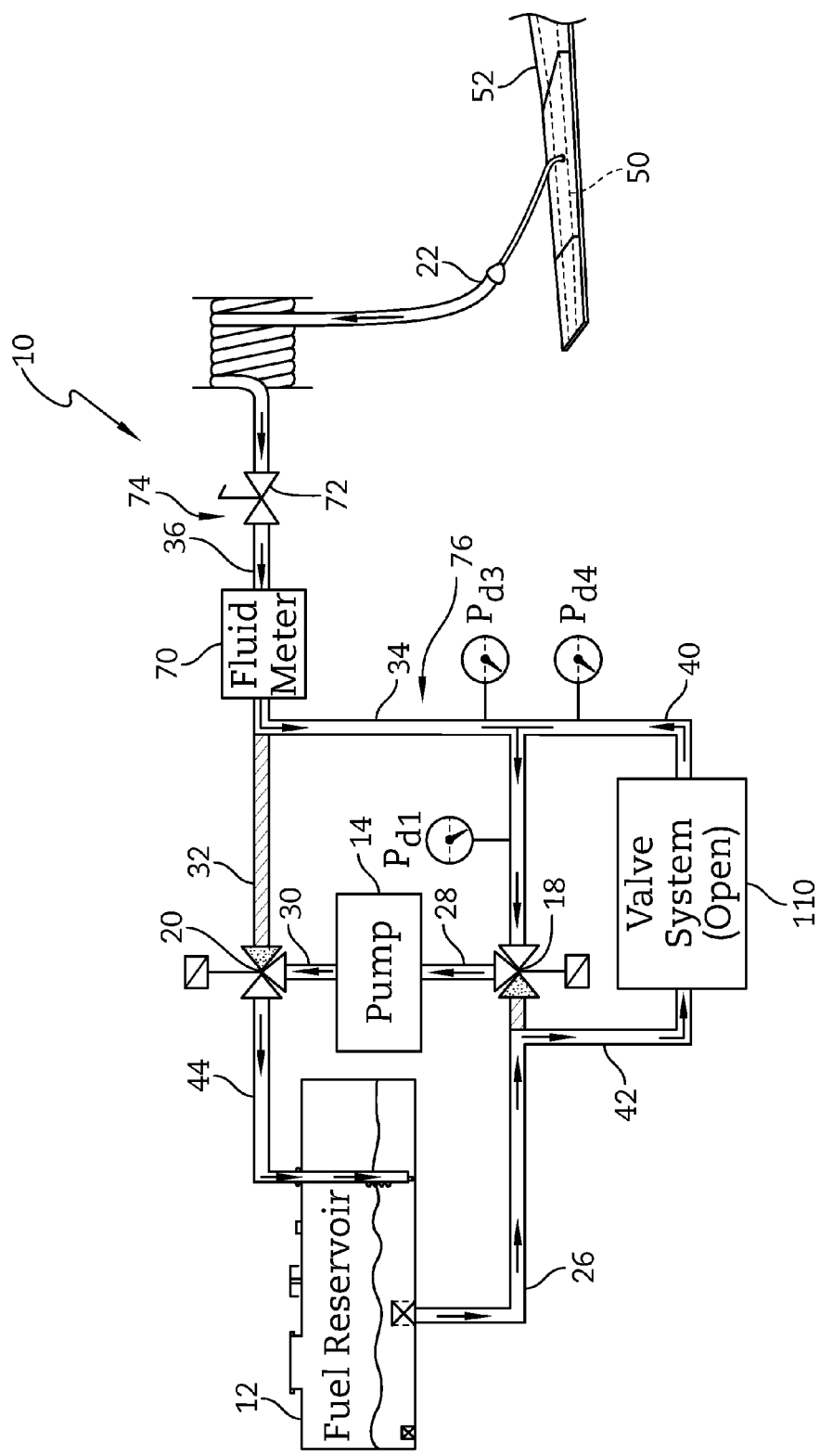
FIG. 11 is a partial diagrammatic view of the pump system of FIG. 3 during a defueling event where the pump system is blocked from delivering a pressure load exceeding the delta-pressure threshold.
Figure 12:
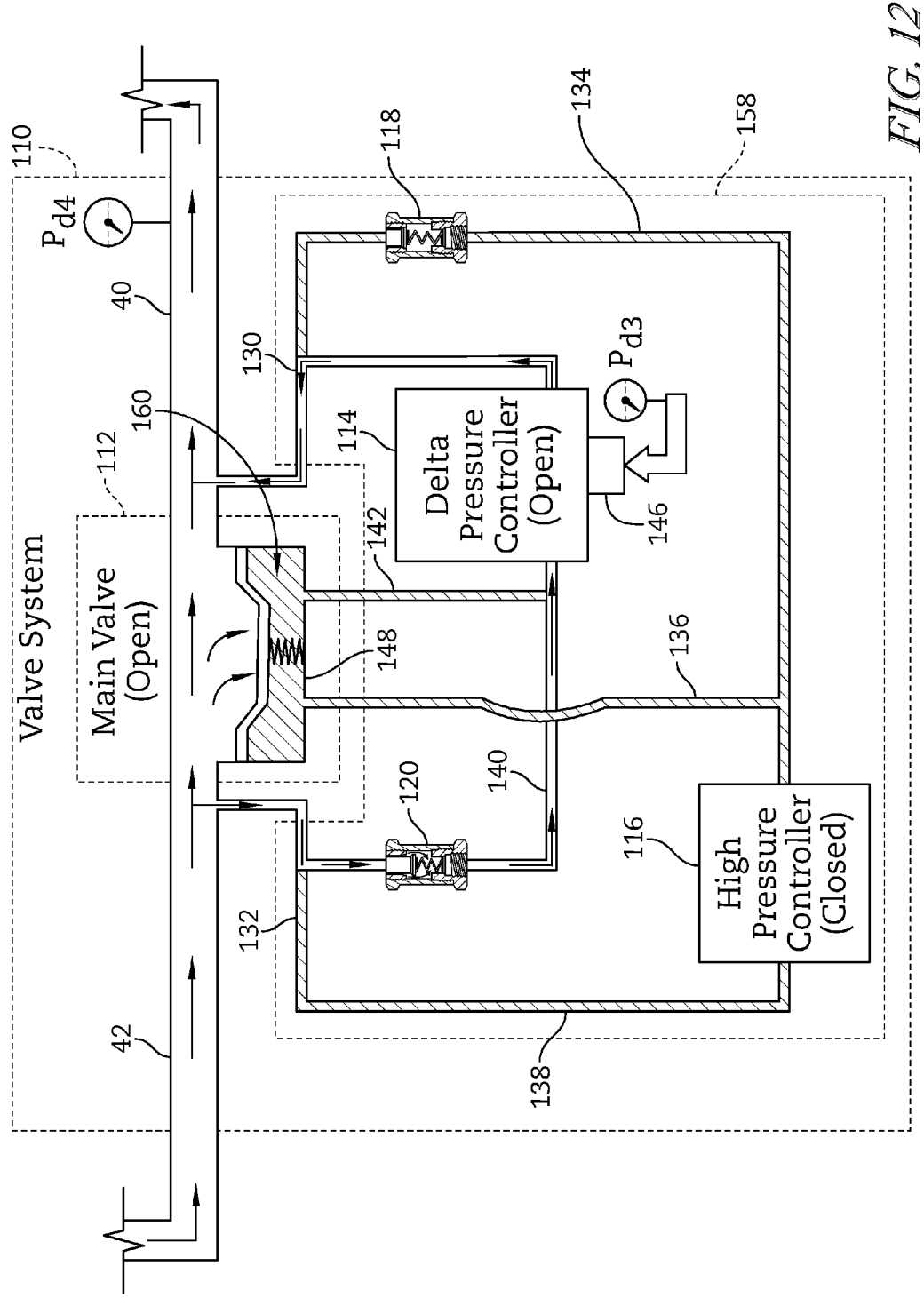
FIG. 12 is a partial diagrammatic view of the valve system of FIG. 4 during a defueling event where the pump system is blocked from delivering a pressure load exceeding the delta-pressure threshold.

During a defueling event, the pressure of the fuel in the pump system 10 may inadvertently create a low-pressure defueling event shown in FIGS. 11 and 12. In a low-pressure defueling event, the low pressure produced by the pump system 10 cause pressures in the pump system 10 to be equal to or greater than the delta-pressure threshold. As a result, the valve system 110 moves to the open position to cause fuel to flow into the defueling conduit 38 from the relief conduit 42 to increase the pressure load delivered to the fuel nozzle 22 as shown in FIG. 11. In the illustrative embodiment, the valve system 110 is configured to move between the open and closed positions automatically.

As shown in FIG. 11, the pump 14 produces a flow of fuel having a pressure $P_{d1}$. In a low-pressure defueling event, the difference between the pressure $P_{d2}$ in the relief conduit 42 and the pressure $P_{d1}$ exceeds the delta-pressure threshold. The pump 14 provides a draw to the defueling conduit 38 having a pressure of about pressure $P_{d1}$ as shown in FIG. 11. As discussed below, a portion of the fuel in the interface conduit 36 from the tank 50 flows into the defueling conduit 38 and another portion of the fuel in the relief conduit 42 from the fuel reservoir 12 flows into the defueling conduit 38 to increase the pressure of the interface conduit 36. The drawing pressure $P_{d1}$ of the fuel in the defueling conduit 38 is split between the bypass conduit 40/relief conduit 42 and the interface conduit 36. As a result, the pressure $P_{d3}$ in the interface conduit 36 is more than the pressure $P_{d1}$, which blocks the pump system 10 from damaging the fuel tank 50.

The pressure $P_{d1}$ of the fuel in the defueling conduit 38 is applied through the diverting conduit 34, the bypass conduit 40, and the valve system 110 as shown in FIG. 11. The valve system 110 opens as a result of the low pressure to allow fuel from the relief conduit 42 to be diverted through the valve system 110 into the defueling conduit 38.

With the valve system 110 open, the fuel in the relief conduit 42 flows through the valve system 110 into the bypass conduit 40. The fuel in the bypass conduit 40 joins the fuel from the fuel tank 50 in the defueling conduit 38 and is recirculated through the pump system 10.

Because the draw from the pump 14 is split between the diverting conduit 34 and the bypass conduit 40, the fuel flowing through the bypass conduit 40 has a pressure $P_{d4}$ as shown in FIG. 11. The fuel that flows through the interface conduit 36 has a pressure $P_{d3}$. The pressure $P_{d1}$ is less than the pressure $P_{d3}$.

During a low-pressure fueling event, the delta-pressure controller opens and the forces in the relief conduit 42 acting on the main valve 112 are greater than the forces from the defueling actuator tube 142 and the bias member 152 as shown in FIG. 12. As a result of the pump system 10 exceeding the delta-pressure threshold, the valve system 110 opens to increase the pressure load at the fuel nozzle 22 as shown in FIGS. 11 and 12.

When a low-pressure defueling event first occurs, the pressure in the relief conduit 42 is about equal to pressure $P_{d2}$ as shown in FIG. 10. Similar to the discussion above regarding a defueling event, the pressure $P_{d2}$ is applied through the second pilot tube 132, the fueling relief tube 138, the defueling check tube 140, the defueling actuator tube 142, the diaphragm chamber 160 of the main valve 112, the fueling actuator tube 136, and the fueling check tube 134 as shown in FIG. 10.

Because the difference between the pressure $P_{d2}$ of the fuel in the defueling check tube 140 and the pressure $P_{d1}$ of the fuel in the defueling sense tube 146 is above the delta-pressure threshold in a low-pressure defueling event, the delta-pressure controller 114 opens and the fuel is allowed to flow out of the defueling check tube 140 into the defueling relief tube 144 as shown in FIG. 12. The fuel flows from the defueling relief tube 144 into the first pilot tube 130 and into the bypass conduit 40 as shown in FIG. 12. As such, the pressure in the defueling actuator tube 142 and into the main valve 112 is reduced.

As a result, the fuel from the defueling actuator tube 142 and the main valve 112 have a pressure that is less than the pressure $P_{d2}$, which is applied to the outer surface 156 of the diaphragm 150. The fuel in the relief conduit 42 has a pressure of about pressure $P_{d2}$, which is applied to the inner surface 154 of the diaphragm 150. Because the force on the inner surface 154 is greater than the force on the outer surface 156, the force on the inner surface 154 overcomes the bias member 152 and causes the diaphragm 150 to move and the main valve 112 to be in the open position as shown in FIG. 12.

In the open position, the fuel in the relief conduit 42 is allowed to flow through the main valve 112 into the bypass conduit 40 as shown in FIG. 12. As a result, a portion of the fuel from the fuel reservoir 12 is diverted into the defueling conduit 38 as shown in FIG. 11 and is then recirculated into the pump 14. Because a portion of the draw from the pump is used to recirculate fuel through the valve system 110 form the fuel reservoir 12, the pump system 10 produces a pressure load of about pressure $P_{d3}$ at the fuel nozzle 22 and the delta-pressure threshold is not exceeded.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fuel cart for fueling and defueling an aircraft, the fuel cart comprising:

a mobile fuel reservoir configured to store and transport fuel, a single pump configured to move between a fueling mode in which the pump is configured to move fuel from the fuel reservoir to an aircraft and a defueling mode in which the pump is configured to move fuel from the aircraft to the fuel reservoir, a pump circuit including (i) a first three-way valve coupled to a first port of the pump and coupled to the fuel reservoir by a fuel withdraw conduit, (ii) a second three-way valve coupled to the first three-way valve by an intermediate conduit, coupled to a second port of the pump, and coupled to the fuel reservoir by a fuel return conduit, and (iii) an aircraft interface fluidly coupled to the intermediate conduit between the first three-way valve and the second three-way valve to conduct fuel from the fuel reservoir into the aircraft when the pump is in the fueling mode and to conduct fuel from the aircraft toward the fuel reservoir when the pump is in the defueling mode, and a valve system fluidly coupled to the intermediate conduit by a bypass conduit and fluidly coupled to the fuel withdraw conduit by a relief conduit and the valve system configured to allow fluid communication between the intermediate conduit and the fuel withdraw conduit in response to one of (i) a pressure load of fuel in the bypass conduit that exceeds a high-pressure threshold to block a pressure load of fuel in the aircraft interface from exceeding the high-pressure threshold when the pump is in the fueling mode and (ii) a difference between atmospheric pressure and a pressure load of fuel in the bypass conduit that exceeds a delta-pressure threshold to block the pressure load of fuel in the aircraft interface from exceeding the delta-pressure threshold when the pump is in the defueling mode.

2. The fuel cart of claim 1, wherein the valve system includes (i) a main valve fluidly coupled to the intermediate conduit by the bypass conduit and fluidly coupled to the fuel withdraw conduit by the relief conduit and (ii) a valve control circuit fluidly coupled to the intermediate conduit, coupled to the fuel withdraw conduit, and coupled to the main valve, the main valve is configured to move between a closed position in which fluid commination between the intermediate conduit and the fuel withdraw conduit is blocked through the main valve and an open position in which fluid commination between the intermediate conduit and the fuel withdraw conduit is allowed through the main valve, and the valve control circuit is configured to cause the main valve to move to the open position in response to one of (i) a pressure load of fuel in the bypass conduit that exceeds the high-pressure threshold when the pump is in the fueling mode and (ii) a difference between atmospheric pressure and a pressure load of fuel in the bypass conduit that exceeds the delta-pressure threshold when the pump is in the defueling mode.

3. The fuel cart of claim 2, wherein the main valve includes a housing and a diaphragm coupled to the housing to form a diaphragm chamber therebetween, the diaphragm includes a first surface configured to be acted on by fuel in the bypass conduit and the relief conduit and a second surface configured to be acted on by fuel in the diaphragm chamber, and the main valve is configured to move to the closed position in response to a pressure of the fuel acting on the second surface being greater than or equal to a pressure of the fuel acting on the first surface and to move to the open position in response to the pressure of the fuel acting on the second surface being less than the pressure of the fuel acting on the first surface.

4. The fuel cart of claim 3, wherein the valve control circuit includes a high-pressure controller valve having a first side fluidly coupled to the bypass conduit by a fueling check tube and to the diaphragm chamber of the main valve by a fuel actuator tube and having a second side fluidly coupled to the relief conduit by a fueling relief tube.

5. The fuel cart of claim 4, wherein the high-pressure controller valve is configured to move from
(i) a closed position in which fluid communication between the fueling check tube and the fueling relief tube is blocked so that fuel in the fueling check tube is conducted into the diaphragm chamber by the fuel actuator tube to cause a pressure of fuel in the diaphragm chamber acting on the second surface of the diaphragm to be equal to the pressure of fuel in the bypass conduit acting on the first surface to cause the main valve to be in the closed position to
(ii) an open position in which fluid communication between the fueling check tube and the fueling relief tube is allowed in response to a pressure load of fuel in the fueling check tube exceeding the high-pressure threshold to cause the pressure of fuel in the diaphragm chamber acting on the second surface of the diaphragm to be less than the pressure of fuel in the bypass conduit acting on the first surface to cause the main valve to move to the open position.

6. The fuel cart of claim 5, wherein the valve control circuit further includes a delta-pressure controller valve having a first side fluidly coupled to the bypass conduit by a defueling relief tube and having a second side fluidly coupled to the diaphragm chamber of the main valve by a defueling actuator tube and coupled to the relief conduit by a defueling check tube.

7. The fuel cart of claim 6, wherein the delta-pressure controller valve is configured to move from
(i) a closed position in which fluid communication between the defueling check tube and the defueling relief tube is blocked so that fuel in the defueling check tube is conducted into the diaphragm chamber by the defueling actuator tube to cause the pressure of fuel in the diaphragm chamber acting on the second surface of the diaphragm to be equal to the pressure of fuel in the relief conduit acting on the first surface to cause the main valve to be in the closed position to
(ii) an open position in which fluid communication between the defueling check tube and the defueling relief tube is allowed in response to either a difference between a pressure load of fuel in the defueling relief tube and the pressure load of fuel in the defueling check tube exceeding the delta-pressure threshold or a difference between a pressure load of fuel in the aircraft interface and the pressure load of fuel in the defueling check tube exceeding the delta-pressure threshold to cause the pressure of fuel in the diaphragm chamber acting on the second surface of the diaphragm to be less than the pressure of fuel in the relief conduit acting on the first surface to cause the main valve to move to the open position.

8. The fuel cart of claim 3, wherein the valve control circuit further includes a delta-pressure controller valve having a first side fluidly coupled to the bypass conduit by a defueling relief tube and having a second side fluidly coupled to the diaphragm chamber of the main valve by a defueling actuator tube and to the relief conduit by a defueling check tube.

9. The fuel cart of claim 8, wherein the delta-pressure controller valve is configured to move from
(i) a closed position in which fluid communication between the defueling check tube and the defueling relief tube is blocked so that fuel in the defueling check tube is conducted into the diaphragm chamber by the defueling actuator tube to cause a pressure of fuel in the diaphragm chamber acting on the second surface of the diaphragm to be equal to the pressure of fuel in the relief conduit acting on the first surface to cause the main valve to be in the closed position to
(ii) an open position in which fluid communication between the defueling check tube and the defueling relief tube is allowed in response to either a difference between a pressure load of fuel in the defueling relief tube and the pressure load of fuel in the defueling check tube exceeding the delta-pressure threshold or a difference between a pressure load of fuel in the aircraft interface and the pressure load of fuel in the defueling check tube exceeding the delta-pressure threshold to cause the pressure of fuel in the diaphragm chamber acting on the second surface of the diaphragm to be less than the pressure of fuel in the relief conduit acting on the first surface to cause the main valve to move to the open position.

10. The fuel cart of claim 2, wherein the high-pressure threshold is in a range between 20 pounds per square inch and 200 pounds per square inch.

11. The fuel cart of claim 2, wherein the delta-pressure threshold is in a range between 5 pounds per square inch and 25 pounds per square inch.

12. A fuel cart comprising:
a fuel reservoir configured to store fuel,
a single pump configured to move between a fueling mode in which the pump is configured to move fuel from the fuel reservoir to a fuel tank and a defueling mode in which the pump is configured to move fuel from the fuel tank to the fuel reservoir,
a pump circuit including (i) a first three-way valve coupled to a first port of the pump and coupled to the fuel reservoir by a fuel withdraw conduit, (ii) a second three-way valve coupled to the first three-way valve by an intermediate conduit, coupled to a second port of the pump, and coupled to the fuel reservoir by a fuel return conduit, and (iii) a fuel nozzle fluidly coupled to the intermediate conduit between the first three-way valve and the second three-way valve to conduct fuel from the fuel reservoir toward the fuel tank when the pump is in the fueling mode and to conduct fuel from the fuel tank toward the fuel reservoir when the pump is in the defueling mode, and
a valve system configured to allow fluid communication between the intermediate conduit and the fuel withdraw conduit in response to one of (i) a pressure load of fuel in the intermediate conduit exceeding a high-pressure threshold to block a pressure load of fuel at the fuel nozzle from exceeding the high-pressure threshold when the pump is in the fueling mode and (ii) a difference between a pressure load of fuel at the fuel nozzle and a pressure load of fuel in the fuel withdraw conduit exceeding a delta-pressure threshold to block the pressure load of fuel at the fuel nozzle from exceeding the delta-pressure threshold when the pump is in the defueling mode.

\* \* \* \* \*